(12) United States Patent
Sasaki

(10) Patent No.: US 8,094,952 B2
(45) Date of Patent: Jan. 10, 2012

(54) IMAGE PROCESSING APPARATUS AND IMAGE PROCESSING METHOD

(75) Inventor: Tetsuya Sasaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 782 days.

(21) Appl. No.: 12/232,560

(22) Filed: Sep. 19, 2008

(65) Prior Publication Data
US 2009/0074308 A1 Mar. 19, 2009

(30) Foreign Application Priority Data

Sep. 19, 2007 (JP) ................. 2007-243123

(51) Int. Cl.
G06K 9/36 (2006.01)
(52) U.S. Cl. ....................................................... 382/232
(58) Field of Classification Search .................. 382/162, 382/232, 240, 244
See application file for complete search history.

(56) References Cited

U.S. PATENT DOCUMENTS

| 7,209,266 | B2 | 4/2007 | Tabata et al. |
| 7,965,776 | B2 | 6/2011 | Kuroki et al. |
| 2005/0030569 | A1 | 2/2005 | Tabata et al. |
| 2006/0139446 | A1 | 6/2006 | Kuroki et al. |

FOREIGN PATENT DOCUMENTS

| JP | 2004-194266 | 7/2004 |
| JP | 2005-332298 | 12/2005 |
| JP | 2006-049991 | 2/2006 |
| JP | 2006-155412 | 6/2006 |
| WO | 2005/029863 | 3/2005 |

OTHER PUBLICATIONS

Office Action dated Jun. 28, 2011 issued in corresponding Japanese Application No. 2007-243123.

Primary Examiner — Duy M Dang
(74) Attorney, Agent, or Firm — Harness, Dickey & Pierce, P.L.C.

(57) ABSTRACT

An image compressor device includes a memory controller to store a plurality of compressed unit items in the continuous address range, and a pointer generator to generate pointer data including address information of the plurality of compressed unit data items.

18 Claims, 17 Drawing Sheets

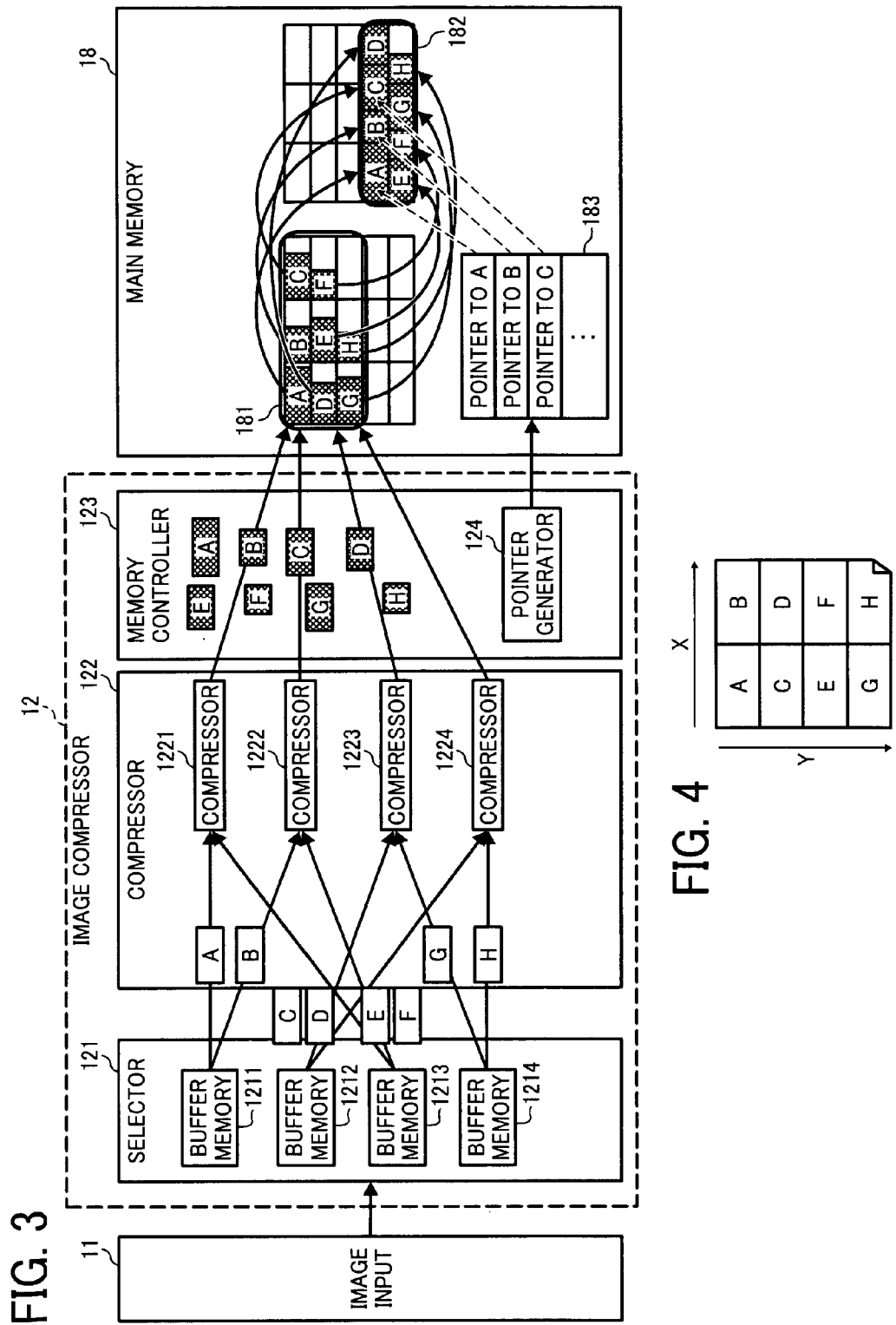

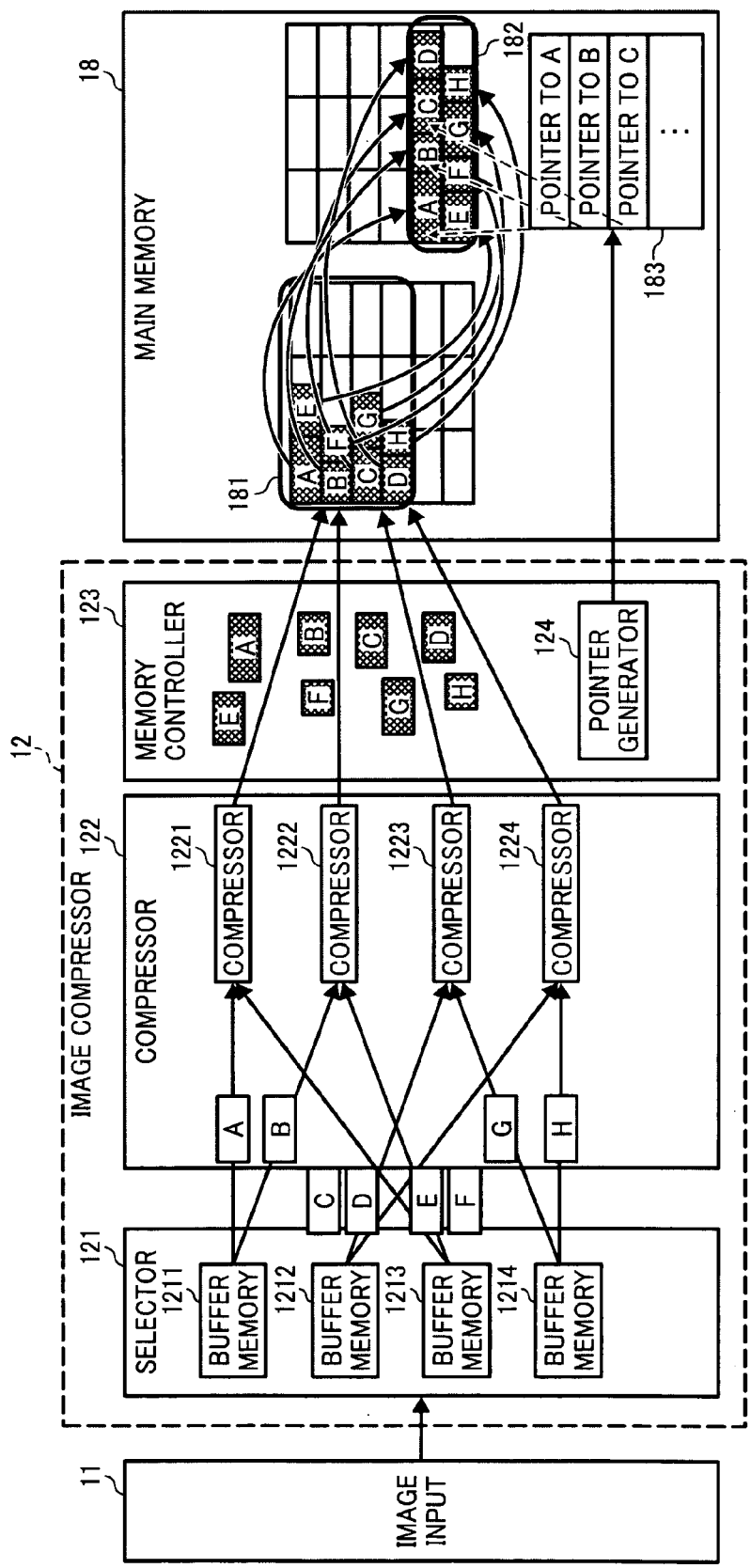

8 PIXELS

| p00 | p01 | p02 | p03 | p04 | p05 | p06 | p07 |
| p10 | p11 | p12 | p13 | p14 | p15 | p16 | p17 |
| p20 | p21 | p22 | p23 | p24 | p25 | p26 | p27 |
| p30 | p31 | p32 | p33 | p34 | p35 | p36 | p37 |
| p40 | p41 | p42 | p43 | p44 | p45 | p46 | p47 |
| p50 | p51 | p52 | p53 | p54 | p55 | p56 | p57 |
| p60 | p61 | p62 | p63 | p64 | p65 | p66 | p67 |
| p70 | p71 | p72 | p73 | p74 | p75 | p76 | p77 |

8 PIXELS

| b00 | b01 | b02 | b03 | b04 | b05 |
| b10 | b11 | b12 | b13 | b14 | b15 |
| b20 | b21 | b22 | b23 | b24 | b25 |
| b30 | b31 | b32 | b33 | b34 | b35 |
| b40 | b41 | b42 | b43 | b44 | b45 |
| b50 | b51 | b52 | b53 | b54 | b55 |
| b60 | b61 | b62 | b63 | b64 | b65 |
| b70 | b71 | b72 | b73 | b74 | b75 |

8 BLOCKS

6 BLOCKS

FIG. 18

| 1 | -2 | 3 | -4 | 5 | -6 |
|---|---|---|---|---|---|
| 7 | -8 | 9 | -10 | 11 | -12 |
| 13 | -14 | 15 | -16 | 17 | -18 |
| 19 | -20 | 21 | -22 | 23 | -24 |
| 25 | -26 | 27 | -28 | 29 | -30 |
| 31 | -32 | 33 | -34 | 35 | -36 |
| 37 | -38 | 39 | -40 | 41 | -42 |
| 43 | -44 | 45 | -46 | 47 | -48 |

FIG. 19A

| 1 | -2 | 3 | -4 | 5 | -6 |
|---|---|---|---|---|---|
| 7 | -8 | 9 | -10 | 11 | -12 |
| 13 | -14 | 15 | -16 | 17 | -18 |
| 19 | -20 | 21 | -22 | 23 | -24 |
| 25 | -26 | 27 | -28 | 29 | -30 |
| 31 | -32 | 33 | -34 | 35 | -36 |
| 37 | -38 | 39 | -40 | 41 | -42 |
| 43 | -44 | 45 | -46 | 47 | -48 |

FIG. 19B

| 1 | -3 | 5 | -7 | 9 | -11 |
|---|---|---|---|---|---|
| 13 | -15 | 17 | -19 | 21 | -23 |
| 25 | -27 | 29 | -31 | 33 | -35 |
| 37 | -39 | 41 | -43 | 45 | -47 |
| 49 | -51 | 53 | -55 | 57 | -59 |
| 61 | -63 | 65 | -67 | 69 | -71 |
| 73 | -75 | 77 | -79 | 81 | -83 |
| 85 | -87 | 89 | -91 | 93 | 95 |

IMAGE PROCESSING APPARATUS AND IMAGE PROCESSING METHOD

CROSS-REFERENCE TO RELATED APPLICATIONS

This patent application is based on and claims priority under 35 U.S.C. §119 to Japanese Patent Application No. 2007-243123, filed on Sep. 19, 2007, in the Japanese Patent Office, the disclosure of which is hereby incorporated herein by reference.

FIELD OF THE INVENTION

Example embodiments of the present invention generally relate to an apparatus and method of image processing, and more specifically to an apparatus and method of image processing related to image compression or image expansion.

BACKGROUND

After reading an original document into image data, the image data may be stored in a memory of an image forming apparatus in a compressed format to effectively use the memory space, which is limited. For example, JPEG or JPEG 2000 compression may be applied to RGB image data obtained by scanning to generate compressed image data. When printing, the compressed image data read out from the memory is expanded to generate expanded image data.

For example, FIG. 1 is a timing chart illustrating operation of compressing image data performed by a background image compressor including a selector provided with a buffer memory, a compressor, and a main memory. When image data is input, the selector divides the image data into unit data A to H, and stores the unit data A to H in the buffer memory. The compressor reads out the unit data A to H from the buffer memory, applies compression to the unit data A to H to generate compressed unit data A to H, and stores the compressed unit data A to H in the main memory.

Recently, there is a need for processing the image data that is large in data size. In order to save the memory space, a user may want to apply various image processing such as editing to a selected portion of the compressed image data without requiring the entire image data to be expanded. However, depending on the compression standard of the compressed image data, image processing can be applied to the selected portion only after the entire image data is expanded.

JPEG 2000 standard allows the user to selectively apply image processing without requiring the entire image data to be expanded. For example, the user may expand a specific portion of the compressed image data and apply image processing to the specific portion of the image data. In order to allow the user to expand the selected portion of the image data, the selected portion, which may be defined by the unit data, should be randomly accessible.

Referring back to FIG. 1, in the case of operation performed by the background image compressor, the compression rates are different from unit data to unit data. Accordingly, the address of unit data in the memory space is not previously defined. Since the address of unit data is not predictable at the time of random accessing, the time for processing random access may increase. Further, the memory space may not be effectively used as the memory space contains the address not storing any data.

In addition to the need for the effective use of memory space, there is a need for increasing the overall processing speed. As indicated by the arrow shown in FIG. 1, the buffer memory is not overwritten until processing of all unit data A to H is completed. This may cause the processing time T1 needed for compressing image data to be relatively long.

SUMMARY

Example embodiments of the present invention include an image processing apparatus including an input device to input image data, an image compressor device to compress the image data into compressed image data, and a storage device to store the compressed image data. The image compressor device includes an image divider to divide the image data into a plurality of unit data items; a compressor to compress the plurality of unit data items into a plurality of compressed unit data items; a memory controller to store the plurality of compressed unit data items in the storage device in a manner that the plurality of compressed unit data items are arranged in the continuous address range; and a pointer generator to generate pointer data including address information of the plurality of compressed unit data items, the address information of the compressed unit data item specifying a location of the compressed unit data item.

Example embodiments of the present invention include an image processing method including: inputting image data; dividing the image data into a plurality of unit data items; compressing the plurality of unit data items into a plurality of compressed unit data items; storing the plurality of compressed unit data items in a storage device in a manner that the plurality of compressed unit data items are arranged in the continuous address range; and generating pointer data including address information of the plurality of compressed unit data items, the address information of the compressed unit data item specifying a location of the compressed unit data item.

Example embodiments of the present invention include an image processing apparatus including a storage device to store compressed image data including a plurality of compressed unit data items and pointer data including address information of the plurality of compressed unit data items, the address information of the compressed unit data item specifying a location of the compressed unit data item in the storage device; and an image expander device to expand the compressed image data into expanded image data. The image expander device includes an expander controller to obtain the pointer data from the storage device, and define a portion of the compressed unit data to be expanded; and an image expander to expand one or more of the plurality of compressed unit data items that corresponds to the defined portion of the compressed image data.

Example embodiments of the present invention include an image processing method including: storing compressed image data including a plurality of compressed unit data items and pointer data including address information of the plurality of compressed unit data items, the address information of the compressed unit data item specifying a location of the compressed unit data item; obtaining the pointer data from the storage device; defining a portion of the compressed unit data to be expanded; and expanding one or more of the plurality of compressed unit data items that corresponds to the defined portion of the compressed image data.

In addition to the above-described example embodiments, the present invention may be practiced in various other ways, for example, as an image processing system or an image processing program that may be stored in a recording medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a schematic block diagram illustrating a structure of an image compressor of the image processing apparatus shown in FIG. 1, according to an example embodiment of the present invention;

FIG. 4 is an illustration for explaining operation of dividing image data into unit data, according to an example embodiment of the present invention;

FIG. 5 is a schematic block diagram illustrating a structure of an image compressor of the image processing apparatus shown in FIG. 1, according to an example embodiment of the present invention;

FIG. 18 is an illustration of a plurality of DC coefficients obtained through quantization;

FIG. 19A is an illustration of a plurality of quantized DC coefficients before applying encoding according to an example embodiment of the present invention;

FIG. 19B is an illustration of a plurality of DC coefficients before applying encoding according to JPEG compression method;

Figure 1:
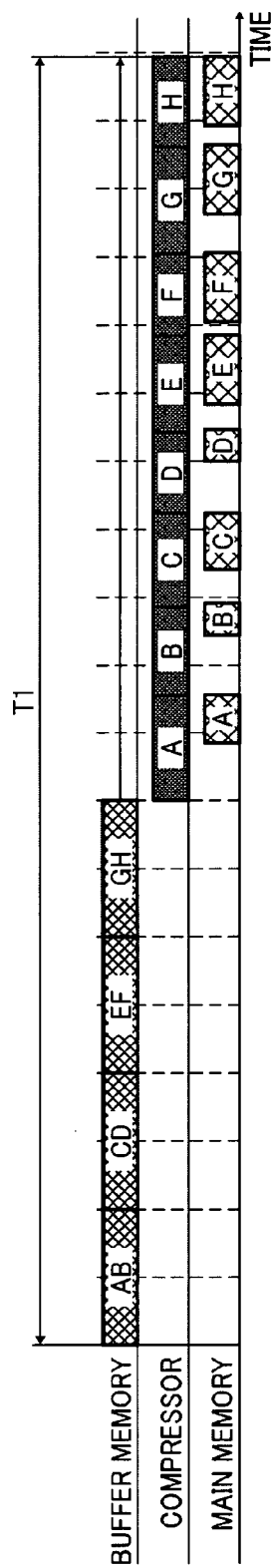
FIG. 1 is a timing chart illustrating operation of compressing image data, performed by a background image compressor.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. For example, in this disclosure, the terminology compressor is used, however, any terminology that has the function of compressor may be used in replace of compressor including an encoder, coder, etc. In another example, in this disclosure, the terminology expander is used, however, any terminology that has the function of expander may be used in replace of expander including a decoder, decompressor, etc. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
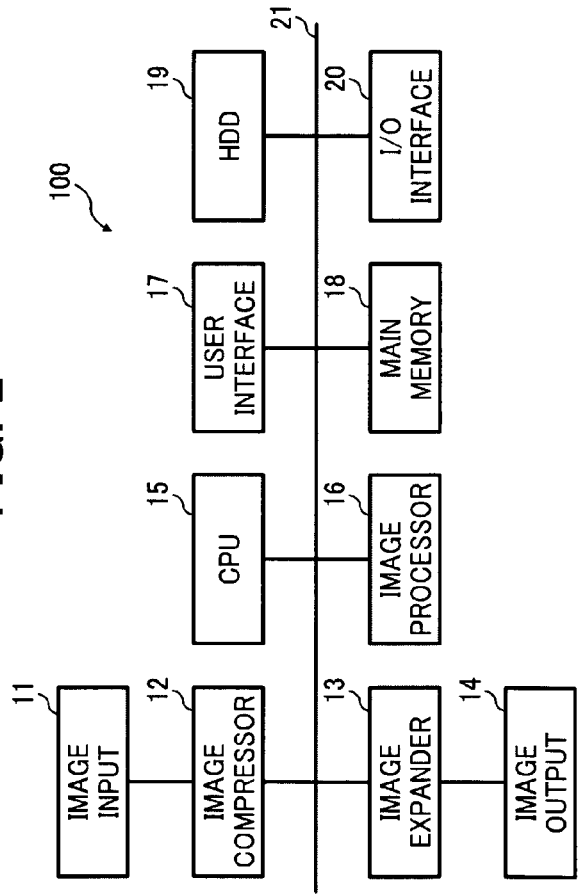
FIG. 2 is a schematic block diagram illustrating a hardware structure of an image processing apparatus according to an example embodiment of the present invention.

Referring now to FIG. 2, an example structure of an image processing apparatus 100 is explained according to an example embodiment of the present invention. The image processing apparatus 100 of FIG. 2 includes an image input 11, an image compressor 12, an image expander 13, an image output 14, a central processing unit (CPU) 15, an image processor 16, a user interface 17, a main memory 18, a hard disk drive (HDD) 19, and an input/output (I/O) interface 20, which are connected through a bus 21.

The image input 11 reads an original document into image data. For example, the image input 11 may be implemented by a scanner device, which reads the original document into image data using an imaging device such as a Charged Coupled Device (CCD) linear image sensor. The image input 11 may further apply various image processing to the image data such as shading correction. Further, by applying RGB processing including color space conversion, filtering, Y conversion, or magnification processing, the image input 11 may output the image data in RGB format. In alternative to the CCD linear image sensor, any desired sensor may be used as the imaging device including, for example, contact image sensor, CCD area image sensor, or Complementary Metal-Oxide Semiconductor (CMOS) sensor.

The image compressor 12, which may be implemented by an Application Specification Integrated Circuit (ASIC), may divide the image data output from the image input 11 into a plurality of sections. From one or more of the plurality of sections, the image compressor 12 may form unit data. For example, when JPEG 2000 compression is used, the image data may be split into a plurality of sections, and a tile may be generated from one or more of the plurality of sections. In another example, when JPEG compression is used, the image data may be split into a plurality of sections, and a block may be generated from one or more of the plurality of sections. For the descriptive purpose, in this specification, data generated from one or more sections split from the image data may be referred to as unit data.

The image compressor 12 may further compress the unit data into compressed unit data in compliance with any desired compression standard, and store the compressed unit data in the main memory 18. In one example, the unit data may be compressed in compliance with JPEG 2000 standard. In another example, the unit data may be compressed in compliance with a compression method according to an example embodiment of the present invention, which is described below referring to FIG. 19A. For the descriptive purpose, the compression method according to an example embodiment of the present invention may be referred to as the first compression method. Alternatively, any desired compression standard may be used including variable length coding such as JPEG standard or fixed length coding.

When JPEG compression standard is used, the image compressor 12 generates a plurality of blocks with each block having a predetermined number of pixels in the main scanning and the sub-scanning directions. In the case of JPEG standard, the unit for one block is 8 by 8 pixels. For each block, the image compressor 12 applies compression. The compressed image data may be stored in the main memory 18.

When JPEG 2000 compression standard is used, the image compressor 12 generates a plurality of tiles with each tile having a predetermined number of pixels in the main scanning and the sub-scanning directions. In the case of JPEG 2000 standard, the unit for one tile may be 128 by 128 pixels or any desired size. Further, any desired number of tiles may be applied with compression. The compressed or uncompressed tile may be stored as one file such that editing may be selectively applied to one file. In such case, the selected file is read out from the main memory 18, for example, by the CPU 15 in the burst read mode. For this reason, it is preferable to store the unit data in the main memory 18 in the order in which the unit data, or the corresponding portion of the image data, is obtained by the image input 11.

The image expander 13, which may be implemented by an ASIC, expands the compressed image data stored in the main memory 18 to expanded image data in RGB format. In this example, the compressed image data may be stored in any device other than the main memory 18. In such case, the compressed image data may be copied onto the main memory 18 before processing. Alternatively, the compressed image data may be compressed by any apparatus other than the image processing apparatus 100. In such case, the compressed image data may be obtained through the I/O interface 20.

The image output 14 may include an image forming device, which converts the RGB image data received from the image expander 13 into CMYK image data, and forms an image onto a recording medium according to the CMYK image data using any desired image forming method such as laser printing or ink jet printing.

The CPU 15 controls operation of the image processing apparatus 100. For example, the CPU 15 may be provided with a memory such as a random access memory (RAM) that functions as a work area of the CPU 15 and a read only memory (ROM) that stores an image processing program. Upon activation, the CPU 15 loads the image processing program onto the RAM, and performs image processing according to the image processing program. For example, the CPU 15 may perform image processing such as image compression, image expansion, or optical character recognition (OCR) processing according to the image processing program. Alternatively, the image processing program may be stored in any other memory such as the HDD 19 or any storage device accessible by the image processing apparatus 100 through the I/O interface 20. Alternatively, the function of the RAM of the CPU 15 may be performed by the main memory 18.

The image processor 16 applies various image processing to image data including, for example, magnification processing, image editing, image rotation, format conversion, rendering, etc.

The user interface 17 may allow the image processing apparatus 100 to interact with the user. For example, the user interface 17 includes an input device such as a keyboard or a key, and an output device such as a display. The user interface 17 may be provided as a touch panel screen, which provides the functions of inputting and outputting.

The main memory 18, which may be implemented by a synchronous dynamic random access memory (DRAM), stores various data such as the compressed image data or point data including a pointer table.

The HDD 19, which may be implemented by a magnetic or optical storage device, stores various data including, for example, the image data input by the image input 11, the expanded data expanded by the image expander 13, image data or document data obtained through the I/O interface 20, various programs including the image processing program or an image forming program, various configuration data, font data, stamp data to be added as a mark, etc.

The I/O interface 20 allows the image processing apparatus 100 to communicate with an outside apparatus such as a personal computer (PC) or the other image processing apparatus to exchange data.

In this example, the image processing apparatus 100 may perform one or more image processing functions including the functions of copying, scanning, printing, faxing, transmitting data, etc. Further, the image processing apparatus 100 may apply various image processing as necessary including editing, rotation, etc.

In copying operation, the image input 11 reads an original document into RGB image data. The image compressor 12 compresses the RGB image data into compressed image data based on any desired compression standard, and stores the compressed image data in the main memory 18. The image processor 16 may apply various image processing including, for example, magnification processing, image editing, or image rotation, to the compressed image data. The image expander 13 converts the compressed RGB image data to expanded RGB image data. The image output 14 converts the RGB image data to CMYK image data, and forms an image on a recording medium according to the CMYK image data.

In data transmission operation, the image input 11 reads an original document into RGB image data. The image compressor 12 compresses the RGB image data into compressed image data using any desired compression standard, and stores the compressed image data in the main memory 18. The image processor 16 may apply various image processing including, for example, magnification processing, image editing, or image rotation, to the compressed image data. The compressed image data is sent to the outside apparatus through the I/O interface 20. In this example, the compressed image data may be sent in TIFF or PDF format. Alternatively, the compressed image data may be sent in RGB format.

The image processing apparatus of FIG. 1 may be implemented in various ways. In this example, the image compressor 12, the image expander 13, and the image processor 16 are each provided independently from one another. Alternatively, one or more of the image compressor 12, the image expander 13, and the image processor 16 may be provided as one or more functions provided by the CPU 15. Alternatively, at least two of the image compressor 12, the image expander 13, and the image processor 16 may be combined as one or more functions provided by an ASIC.

In another example, the image compressor 12 or the image expander 13 may not be provided, depending on the function to be provided by the image processing apparatus 100. In another example, the image input 11 or the image output 14 may not be provided, depending on the function to be provided by the image processing apparatus 100. In another example, the image processor 16 may not be provided, depending on the function to be provided by the image processing apparatus 100.

Referring now to FIGS. 3 to 9, operation of compressing image data, performed by the image processing apparatus 100 shown in FIG. 1, is explained according to example embodiments of the present invention. For the descriptive purpose, in the following examples, the image data is compressed in compliance with JPEG 2000 standard.

Referring to FIG. 3, an example structure of the image compressor 12 is explained according to an example embodiment of the present invention. The image compressor 12 includes a selector 121, a compressor 122, and a memory controller 123.

The selector 121 divides the image data input by the image input 11 into unit data. The selector 121 includes a plurality of buffer memories 1211 to 1214. Each unit data is stored in one of the buffer memories 1211 to 1214. In one example, the buffer memories 1211 to 1214 may each be implemented by one storage element. In another example, the buffer memories 1211 to 1214 may each correspond to a storage area of one storage element.

Referring to FIG. 4, operation of dividing the image data into unit data, performed by the selector 121, is explained according to an example embodiment of the present invention. In this example, the image data input by the image input 11 is assumed to be color image data of one page. Further, as described above, it is assumed that the image compressor 122 compresses the image data in compliance with the JPEG 2000 standard.

The image input 11 firstly scans the image data in the scanning direction X and the sub-scanning direction Y to read a first section including a section A and a section B to generate image data corresponding to the first section. The image input 11 further scans the image data in the scanning direction X and the sub-scanning direction Y to read a second section including a section C and a section D to generate image data corresponding to the second section. In a substantially similar manner, the image input 11 reads a third section including a section E and a section F to generate image data corresponding to the third section, and further reads a fourth section including a section G and a section H to generate image data corresponding to the fourth section. The plurality of sections of the image data being read is input to the selector 121 of the image compressor 12 in the order being read.

The selector 121 divides the image data into a plurality of unit data items according to the order being read. For example, when the selector 12 receives the image data corresponding to the first section, the selector 12 divides the image data into unit data corresponding to the section A and unit data corresponding to the section B. In a substantially similar manner, the selector 12 generates unit data respectively corresponding to the sections C, D, E, F, G, and H. The unit data is subsequently stored in the buffer memories 1211 to 1214. For the descriptive purpose, the unit data corresponding to the sections A, B, C, D, E, F, G, and H may be respectively referred to as the unit data A, B, C, D, E, F, G, and H.

More specifically, the selector 121 stores the image data input by the image input 11 in the buffer memory 1211 until a number of lines of the image data being stored in the buffer memory 1211 reaches a predetermined number. When the number of lines of the image data being stored reaches the predetermined number, the selector 121 stores the subsequent lines of the image data in the buffer memory 1212. For example, when the image data is the A4 size image data having the width of 210 mm and the length of 297 mm and having 600 dots per inch (dpi) resolution, the image data has 4961 pixels in the main scanning direction X and 7016 pixels in the sub-scanning direction Y. In such case, when a number of lines of the image data being stored in the buffer memory 1211 reaches 1240, the following lines of the image data are stored in the buffer memory 1212. In the example case using JPEG 2000 standard, the minimum number of lines of the image data to be stored may be set to 128.

Referring back to FIG. 3, the compressor 122 includes a plurality of compressors 1221 to 1224, each capable of compressing image data. In this example, the compressor 1221 compresses the unit data A stored in the buffer memory 1211 and the unit data E stored in the buffer memory 1213. The compressor 1222 compresses the unit data B stored in the buffer memory 1212 and the unit data F stored in the buffer memory 1213. The compressor 1223 compresses the unit data C stored in the buffer memory 1213 and the unit data G stored in the buffer memory 1214. The compressor 1224 compresses the unit data D stored in the buffer memory 1212 and the unit data H stored in the buffer memory 1214. By applying compression in parallel for all unit data A to H, the compressed unit data A to H is generated with reduced time. The compressed unit data A to H is output to the memory controller 123.

The memory controller 123 stores the compressed unit data A to H in a first memory space 181 of the main memory 18. After storing the compressed unit data A to H in the first memory space 181, the memory controller 123 may rearrange the compressed unit data A to H in the order in which the unit data A to H is obtained by the image input 11, as needed. The memory controller 123 further stores the compressed unit data A to H in a second memory space 182 in the rearranged order. In this example, as illustrated in FIG. 3, the first memory space 181 of the main memory 18 is previously provided with a plurality of memory spaces that respectively correspond to the compressed unit data A to H. With this structure, the memory controller 123 may easily manage the unit data.

Further, referring to FIG. 3, the memory controller 123 is provided with a pointer generator 124. When rearranging the compressed unit data, the pointer generator 124 of the memory controller 123 obtains a starting address in the second memory space 182 at which the compressed unit data starts, and generates a pointer table 183 storing information regarding the starting address for each compressed unit data. In this example, the memory controller 123 stores the pointer table 183 in a predetermined area of the main memory 18 in a manner accessible by the CPU 15. In order to read specific compressed unit data, the CPU 15 firstly refers to the pointer table 183 to obtain the starting address for the specific compressed unit data. With the pointer table 183, random access to each compressed unit data may be effectively performed with reduced time.

In this example, the first memory space 181 of the main memory 18 is previously provided with a plurality of memory spaces that respectively correspond to the compressed unit data A to H. In the case of JPEG 2000 compression, the data size of the unit data after being compressed is not known before compression. For this reason, each memory space that is assigned for each compressed unit data is designed to have a data size that is sufficient to store the unit data before being compressed or the unit data being compressed with the minimum compression rate. As illustrated in FIG. 3, this further causes the compressed unit data being stored in the first memory space 181 to be not continuous in terms of its address. More specifically, the starting address of the compressed unit data B does not subsequently follow the ending address of the compressed unit data A. The memory controller 123 stores the compressed unit data A to H in the second memory space 182 in the order being read by the image input 11 and in a manner that the compressed unit data locates in the continuous address range.

More specifically, the memory controller 123 reads out the compressed unit data A from the first memory space 181, and stores the compressed unit data A in the second memory space 182. Subsequently, the memory controller 123 reads out the compressed unit data B from the first memory space 181, and stores the compressed unit data B in the second memory space 182 at an address following the ending address where the compressed unit data A ends. By repeating the above-described operation for all compressed unit data, the compressed unit data of one image data file is stored in the order being read and in the continuous address range. This improves the efficient use of the memory space as well as the accessibility to the compressed unit data.

Referring now to FIG. 5, an example structure of the image compressor 12 is explained according to an example embodiment of the present invention. The image compressor 12 of FIG. 5 is substantially similar in structure and function to the image compressor 12 of FIG. 3. The differences include the order in which the compressed unit data is stored in the first memory space 181 of the main memory 18.

Referring to FIG. 5, the image compressor 12 includes the selector 121, the compressor 122, and the memory controller 123. In this example, the first memory space 181 of the main memory 18 is previously provided with a plurality of memory spaces that respectively correspond to the plurality of compressors 1221 to 1224 of the compressor 122. The memory controller 123 stores the compressed unit data, which is compressed by one of the compressors 1221 to 1224, in the corresponding one of the memory spaces of the first memory space 181. Since the unit data being stored in the first memory space 181 corresponds to one of the compressors 1221 to 1224, the memory controller 123 may easily manage the unit data.

The memory controller 123 stores the compressed unit data, which is generated by the compressors 1221 to 1224, into the corresponding memory spaces of the first memory space 181 in the order of the compressors 1221, 1222, 1223, and 1224. More specifically, the memory controller 123 stores the compressed unit data A and E, each compressed by the compressor 1221, in the corresponding memory space of the first memory space 181. The memory controller 123 stores the compressed unit data B and F, each compressed by the compressor 1222, in the corresponding memory space of the first memory space 181. The memory controller 123 stores the compressed unit data C and G, each compressed by the compressor 1223, in the corresponding memory space of the first memory space 181. The memory controller 123 stores the compressed unit data D and H, each compressed by the compressor 1224, in the corresponding memory space of the first memory space 181. Accordingly, the compressed unit data is not arranged in the order in which the unit data is obtained by the image input 11.

Further, in the case of JPEG 2000 compression, the data size of the compressed unit data is not known before compression. For this reason, each memory space that is assigned for each compressed unit data is designed to have a data size that is sufficient to store the unit data before being compressed or the unit data being compressed with the minimum compression rate. As illustrated in FIG. 5, this further causes the compressed unit data being stored in the first memory space 181 to be not continuous in terms of its address.

In a substantially similar manner as described above referring to FIG. 3, the memory controller 123 stores the compressed unit data A to H in the second memory space 182 in the order being read by the image input 11 and in a manner that the compressed unit data locates in the continuous address range.

More specifically, the memory controller 123 reads out the compressed unit data A, which is firstly stored in the memory space of the first memory space 181 that corresponds to the compressor 1221, and stores the compressed unit data A in the second memory space 182. Subsequently, the memory controller 123 reads out the compressed unit data B, which is firstly stored in the memory space of the first memory space

181 that corresponds to the compressor 1222, and stores the compressed unit data B in the second memory space 182 at an address following the ending address where the compressed unit data A ends. By repeating the above-described operation for all compressors 1221 to 1224 each storing the compressed unit data, the compressed unit data of one image data file is stored in the order being read and in the continuous address range. This improves the efficient use of the memory space as well as the accessibility to the compressed unit data.

Figure 6:
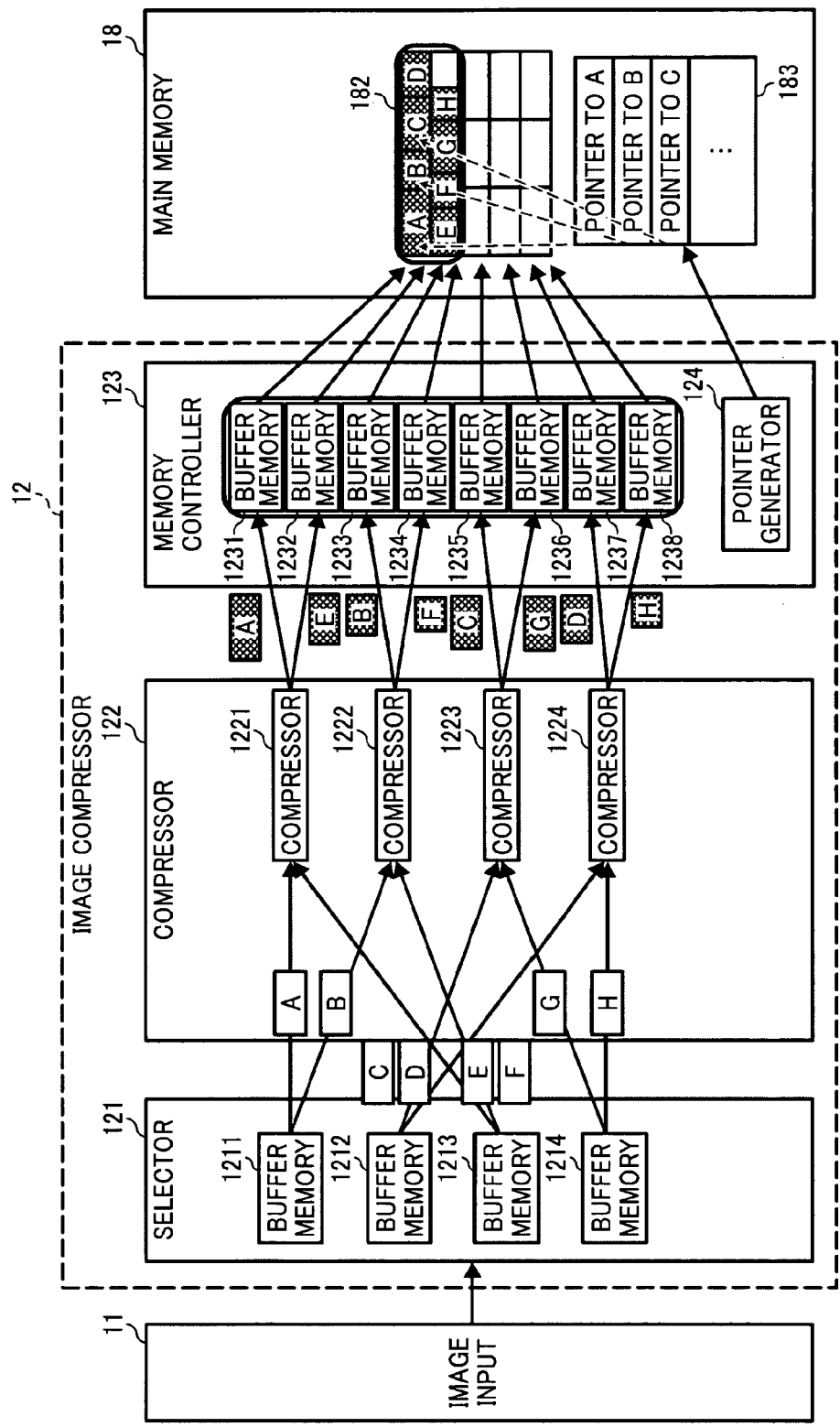
FIG. 6 is a schematic block diagram illustrating a structure of an image compressor of the image processing apparatus shown in FIG. 1, according to an example embodiment of the present invention.

Referring now to FIG. 6, an example structure of the image compressor 12 is explained according to an example embodiment of the present invention. The image compressor 12 of FIG. 6 is substantially similar in structure and function to the image compressor 12 of FIG. 3. The differences include the structure and the function of the memory controller 123. Specifically, in this example, a memory space functioning as the first memory space 181 is provided in the memory controller 123 as a plurality of buffer memories 1231 to 1238.

Referring to FIG. 6, the image compressor 12 includes the selector 121, the compressor 122, and the memory controller 123. In this example, the memory controller 123 additionally includes the plurality of buffer memories 1231 to 1238. Further, two of the buffer memories 1231 to 1238 are assigned to each one of the compressors 1221 to 1224. As described below, the two items of compressed unit data, which are each generated by one compressor, are respectively stored in a first buffer memory and a second buffer memory that are assigned. Since the unit data is stored in a memory space of the memory controller 123 in the order, the memory controller 123 may easily manage the unit data. In one example, the buffer memories 1231 to 1238 may be each implemented by one storage element. In another example, the buffer memories 1231 to 1238 may correspond to a storage area of one storage element.

In operation, the compressor 1221 reads out the unit data A, which is stored in the buffer memory 1211 of the selector 121, compresses the unit data A into compressed unit data A, and stores the compressed unit data A in the buffer memory 1231. The compressor 1222 reads out the unit data B, which is stored in the buffer memory 1211 of the selector 121, compresses the unit data B into compressed unit data B, and stores the compressed unit data B in the buffer memory 1233. The compressor 1223 reads out the unit data C, which is stored in the buffer memory 1212 of the selector 121, compresses the unit data C into compressed unit data C, and stores the compressed unit data C in the buffer memory 1235. The compressor 1224 reads out the unit data D, which is stored in the buffer memory 1212 of the selector 121, compresses the unit data D into compressed unit data D, and stores the compressed unit data D in the buffer memory 1237.

In a substantially similar manner as described above, the compressor 1221 reads out the unit data E, which is stored in the buffer memory 1213 of the selector 121, compresses the unit data E into compressed unit data E, and stores the compressed unit data E in the buffer memory 1232. The compressor 1222 reads out the unit data F, which is stored in the buffer memory 1213 of the selector 121, compresses the unit data F into compressed unit data F, and stores the compressed unit data F in the buffer memory 1234. The compressor 1223 reads out the unit data G, which is stored in the buffer memory 1214 of the selector 121, compresses the unit data G into compressed unit data G, and stores the compressed unit data G in the buffer memory 1236. The compressor 1224 reads out the unit data H, which is stored in the buffer memory 1214 of the selector 121, compresses the unit data H into compressed unit data H, and stores the compressed unit data H in the buffer memory 1238.

In the case of JPEG 2000 compression, the data size of the compressed unit data is not known before compression. For this reason, the memory spaces of the buffer memories 1231 to 1238 are each designed to have a data size that is sufficient to store the unit data before being compressed or the unit data being compressed with the minimum compression rate.

In a substantially similar manner as described above referring to FIG. 3 or 5, as illustrated in FIG. 6, the memory controller 123 stores the compressed unit data A to H in the second memory space 182 of the main memory 18 in the order in which the unit data is read by the image input 11 and in the continuous address range.

More specifically, the memory controller 123 reads out the compressed unit data A, B, C, and D, respectively from the buffer memories 1231, 1233, 1235, and 1237, and stores the compressed unit data A, B, C, and D in the second memory space 182 in the order being read by the image input 11 and in the manner such that the starting address of the succeeding unit data follows the ending address of the preceding unit data. In a substantially similar manner, the memory controller 123 reads out the compressed unit data E, F, G, and H, respectively from the buffer memories 1232, 1234, 1236, and 1238, and stores the compressed unit data E, F, G and H in the second memory space 182 in the order being read by the image input 11 and in the manner such that the starting address of the succeeding unit data follows the ending address of the preceding unit data. This improves the efficient use of the memory space as well as the accessibility to the compressed unit data. Further, referring to FIG. 6, since more than one memory space is assigned to each one of the compressors 1221 to 1224, the processing time required for compressing may be reduced.

Figure 7:
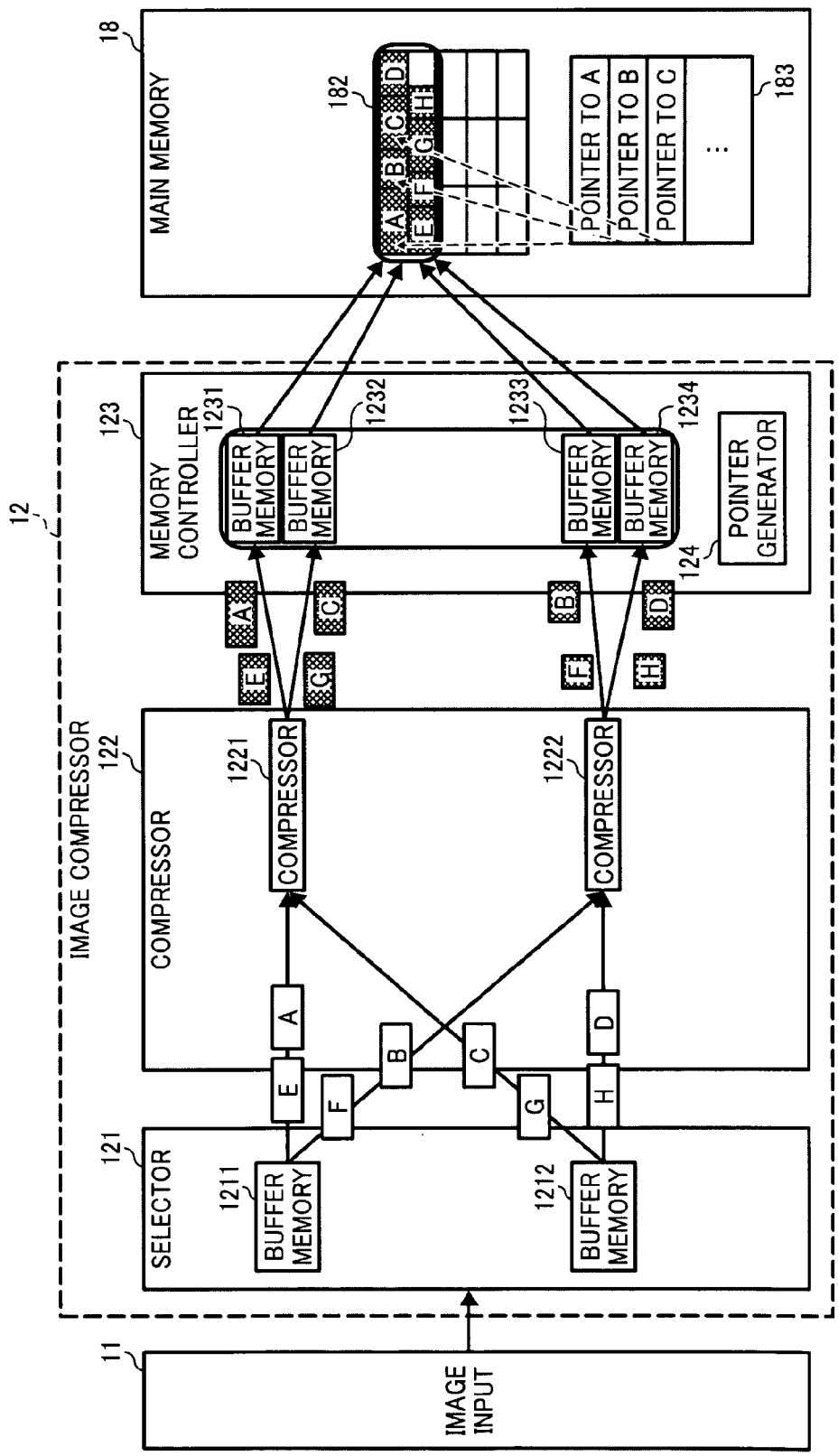
FIG. 7 is a schematic block diagram illustrating a structure of an image compressor of the image processing apparatus shown in FIG. 1, according to an example embodiment of the present invention.

Referring now to FIG. 7, an example structure of the image compressor 12 is explained according to an example embodiment of the present invention. The image compressor 12 of FIG. 7 is substantially similar in structure and function to the image compressor 12 of FIG. 6. The differences include a number of components, such as buffer memories or compressors, provided in the selector 121, the compressor 122, or the memory controller 123.

Referring to FIG. 7, the image compressor 12 includes the selector 121, the compressor 122, and the memory controller 123. In this example, the number of buffer memories of the selector 121 is less than the number of items of unit data, or the number of divisions of the image data. The number of compressors of the compressor 122 is less than the number of items of unit data, or the number of divisions of the image data. The number of buffer memories of the memory controller 123 is less than the number of items of unit data, or the number of divisions of the image data.

Specifically, in this example, the selector 121 includes two buffer memories 1211 and 1212. The compressor 122 includes two compressors 1221 and 1222. The memory controller 123 includes four buffer memories 1231 to 1234. Further, two of the buffer memories 1231 to 1234 are assigned to each one of the compressors 1221 and 1222. With this structure, since the number of buffer memories of the selector 121 is less than the number of divisions in the sub-scanning direction Y of the image data, it is not possible to store the image data of one page in the buffer memories 1211 and 1212 even after dividing the image data into unit data in a manner described above. As described below, the unit data obtained by the image input 11, or the band data, may need to be serially stored in the buffer memories 1211 and 1212.

In operation, the selector 121 stores the unit data A and the unit data B in the buffer memory 1211. The selector 121 stores the unit data C and the unit data D in the buffer memory 1212.

The compressor 1221 reads out the unit data A from the buffer memory 1211, compresses the unit data A into compressed unit data A, and stores the compressed unit data A in the buffer memory 1231. The compressor 1222 reads out the unit data B from the buffer memory 1211, compresses the unit data B into compressed unit data B, and stores the compressed unit data B in the buffer memory 1233. In a substantially similar manner, the compressor 1221 reads out the unit data C from the buffer memory 1212, compresses the unit data C into compressed unit data C, and stores the compressed unit data C in the buffer memory 1232. The compressor 1222 reads out the unit data D from the buffer memory 1212, compresses the unit data D into compressed unit data D, and stores the compressed unit data D in the buffer memory 1234.

After the unit data A and the unit data B are read respectively by the compressor 1221 and the compressor 1222, the unit data E and the unit data F are stored in the buffer memory 1211 at a predetermined timing. After the unit data C and the unit data D are read respectively by the compressor 1221 and the compressor 1222, the unit data G and the unit data H are stored in the buffer memory 1212 at a predetermined timing. The predetermined timing when the buffer memory 1211 or 1212 is overwritten may be controlled using a flag, which changes its value as the unit data is read out from the buffer memory 1211 or 1212. The value of flag may be controlled by, for example, the memory controller 123 or the CPU 15.

As described above referring to FIG. 7, even when the number of buffer memories of the selector 121 or the number of compressors of the compressor 122 is less than the number of divisions of the image data, compression may be effectively performed by subsequently processing the unit data in serial. With the reduced number of buffer memories or compressors, the image processing apparatus 100 may be implemented with reduced cost.

Figure 9:
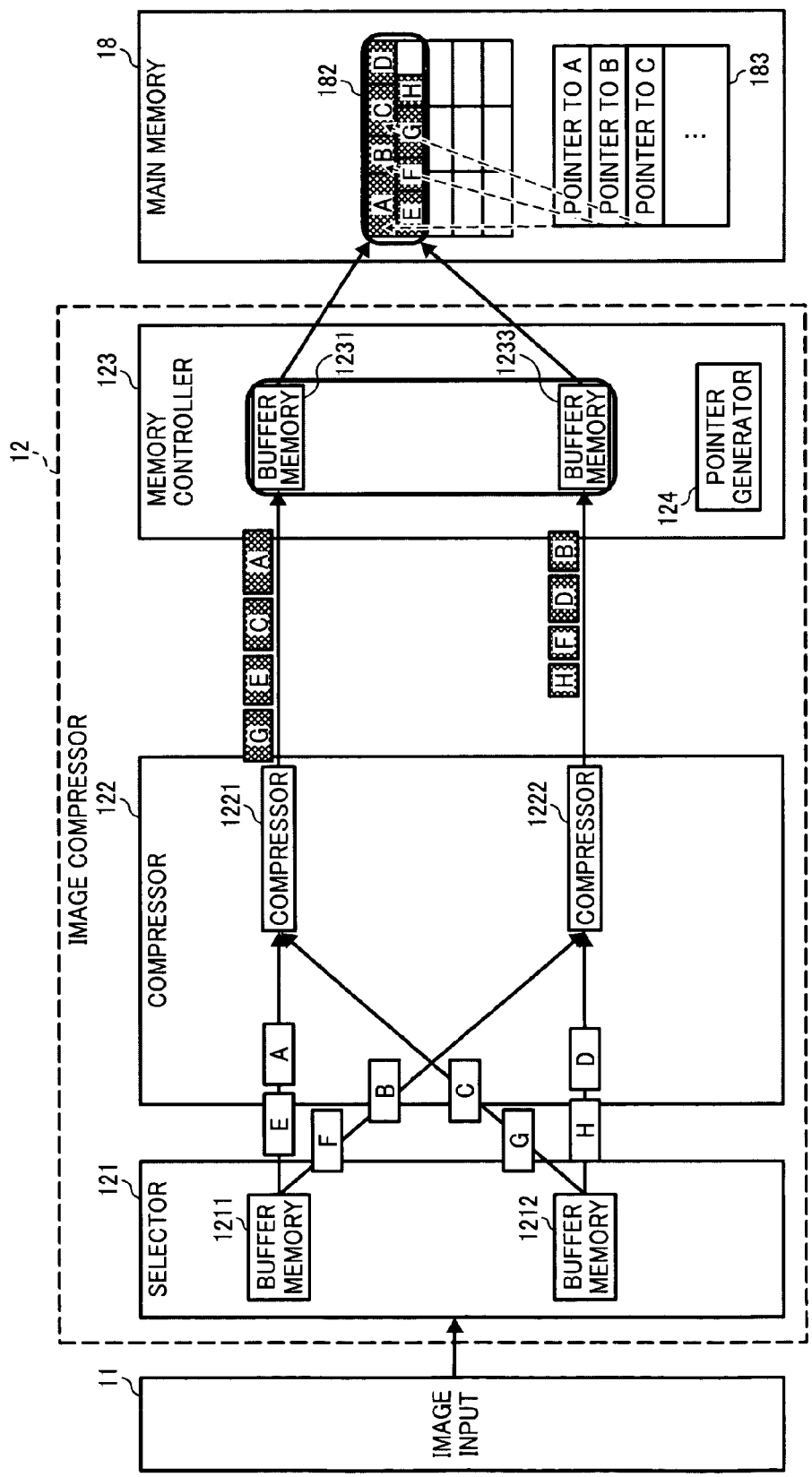
FIG. 9 is a schematic block diagram illustrating a structure of an image compressor of the image processing apparatus shown in FIG. 1, according to an example embodiment of the present invention.

Referring now to FIG. 9, an example structure of the image compressor 12 is explained according to an example embodiment of the present invention. The compressor 12 of FIG. 9 is substantially similar in structure and function to the image compressor 12 of FIG. 7. The differences include the memory controller 123. Specifically, in this example, the number of buffer memories of the memory controller 123 is equal to the number of compressors of the compressor 122.

Referring to FIG. 9, the image compressor 12 includes the selector 121, the compressor 122, and the memory controller 123. In this example, the selector 121 includes two buffer memories 1211 and 1212. The compressor 122 includes two compressors 1221 and 1222. The memory controller 123 includes two buffer memories 1231 and 1233, each functioning as the first memory space. Further, one of the buffer memories 1231 and 1233 is assigned to one of the compressors 1221 and 1222.

With this structure, since the number of buffer memories of the memory controller 123 is equal to the number of compressors of the compressor 122, the compressed unit data may need to be serially stored in the buffer memories 1231 and 1233, respectively.

In operation, the selector 121 stores the unit data A and the unit data B in the buffer memory 1211. The selector 121 stores the unit data C and the unit data D in the buffer memory 1212.

The compressor 1221 reads out the unit data A from the buffer memory 1211, compresses the unit data A into compressed unit data A, and stores the compressed unit data A in the buffer memory 1231. The compressor 1222 reads out the unit data B from the buffer memory 1211, compresses the unit data B into compressed unit data B, and stores the compressed unit data B in the buffer memory 1233.

After the unit data A and the unit data B are read respectively by the compressor 1221 and the compressor 1222, the unit data E and the unit data F are stored in the buffer memory 1211 at a predetermined timing. The predetermined timing when the buffer memory 1211 is overwritten may be controlled by a flag, which changes its value as the unit data is read out from the buffer memory 1211. The value of flag may be controlled by, for example, the memory controller 123 or the CPU 15.

The memory controller 123 reads out the compressed unit data A from the buffer memory 1231, and stores the compressed unit data A in the second memory space 182 of the main memory 18. Subsequently, the memory controller 123 reads out the compressed unit data B from the buffer memory 1233, and stores the compressed unit data B in the second memory space 182 of the main memory 18 such that the starting address of the compressed unit data B follows the ending address of the compressed unit data A.

After storing the compressed unit data A in the main memory 18, the memory controller 123 changes the value of a flag to allow rewriting of the buffer memory 1231. Based on the value of flag, the compressor 1221 reads out the unit data C from the buffer memory 1212, compresses the unit data C into compressed unit data C, and stores the compressed unit data C in the buffer memory 1231.

Subsequently, the main controller 123 reads out the compressed unit data C from the buffer memory 1231, and stores the compressed unit data C in the second memory 182 of the main memory 18 such that the starting address of the compressed unit data C follows the ending address of the compressed unit data B. In this example, when the compressed unit data B is not stored in the main memory 18, the buffer memory 1231 holds the compressed unit data C until the compressed unit data B is stored in the main memory 18. By repeating the above-described operation for all unit data, the unit data of one image data file is stored in the main memory 18 in the order being read by the image input 11 and in the continuous address range. This improves the efficient use of the memory space as well as the accessibility to the compressed unit data.

As described above referring to FIG. 9, even when the number of buffer memories of the memory controller 123 is equal to or less than the number of compressors of the compressor 122, compression may be effectively performed by subsequently storing the compressed unit data. With the reduced number of buffer memories, the image processing apparatus 100 may be implemented with reduced cost.

The image compressor 12 of any one of FIGS. 3, 5, 6, 7, and 9 may be implemented in various other ways. For example, elements and/or features of different illustrative embodiments may be combined with each other and/or substituted for each other within the scope of this disclosure and appended claims.

In the above-described example, data conversion such as color space conversion between RGB and CMYK is applied to the entire image data. Alternatively, data conversion may be applied to specific unit data in a substantially manner as described above. In such case, instead of causing the image input 11 or the image output 14 to apply data conversion, the image processor 16 may be caused to apply data conversion.

In the above-described example, the pointer table 183 is stored in the main memory 18. Alternatively, the pointer table 183 may be stored in the second memory space 182, for example, in a space following the ending address of the last compressed unit data H. Alternatively, the pointer table 183 may be stored in any other desired memory such as the HDD 19.

In the above-described example, the selector 121 divides the image data corresponding to each section into two items of unit data. Alternatively, the selector 121 may compress the image data corresponding to each section without further dividing the image data. Alternatively, the selector 121 may divide the image data corresponding to each section into more than two items of unit data, such as four.

Figure 8:
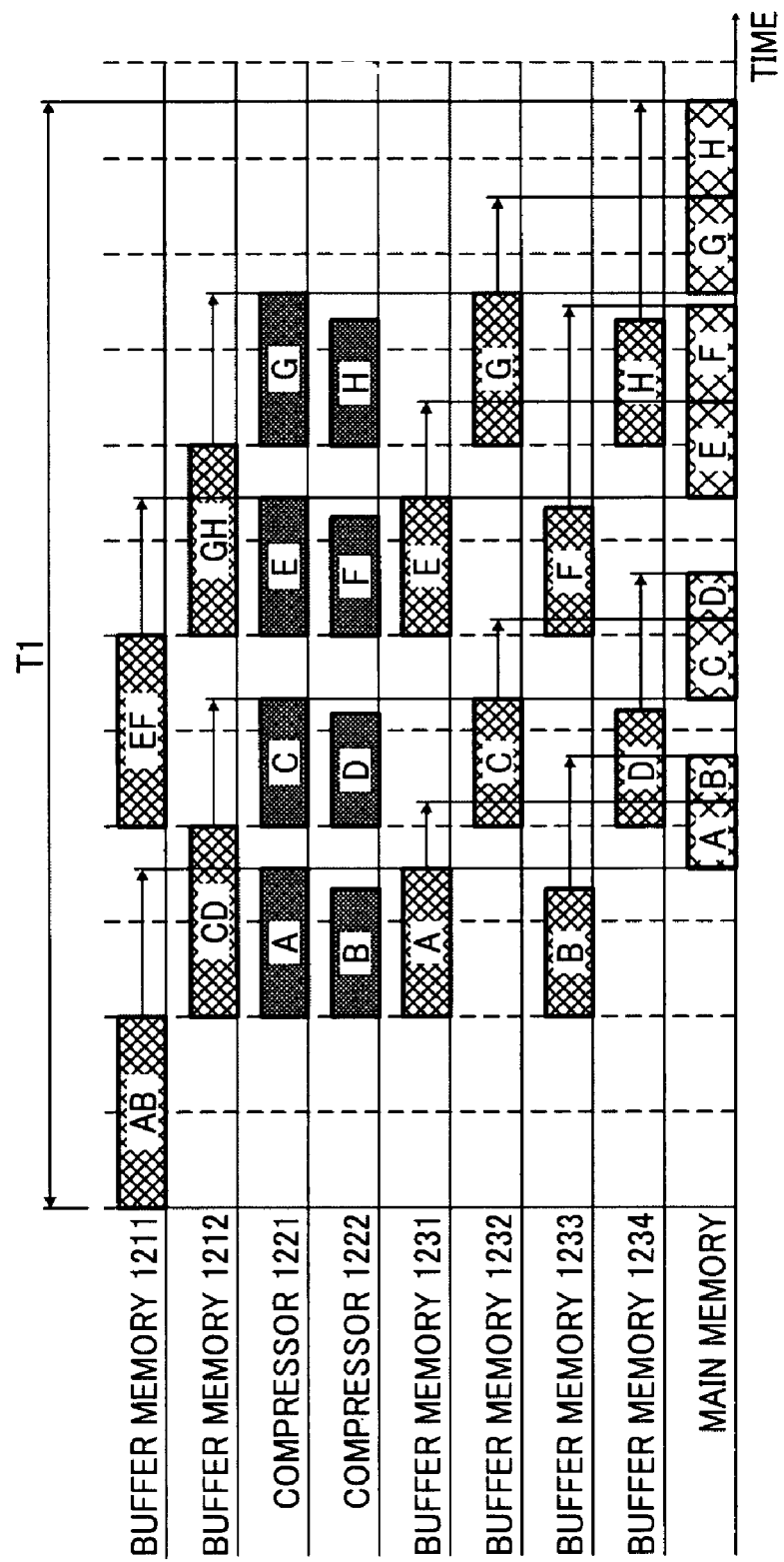
FIG. 8 is a timing chart illustrating operation of compressing image data, performed by the image compressor of FIG. 7, according to an example embodiment of the present invention.

Referring now to FIG. 8, operation of compressing image data, performed by the compressor 12 of FIG. 8, is explained according to an example embodiment of the present invention in comparison with operation of compressing image data performed by the background compressor of FIG. 1.

As illustrated in FIG. 8, the buffer memory 1211 of the selector 121 stores the unit data A and the unit data B. The buffer memory 1212 of the selector 121 stores the unit data C and the unit data D.

The compressor 1221 reads out the unit data A from the buffer memory 1211, compresses the unit data A into the compressed unit data A, and stores the compressed unit data A in the buffer memory 1231 of the memory controller 123. Concurrently, the compressor 1222 reads out the unit data B from the buffer memory 1211, compresses the unit data B into the compressed unit data B, and stores the compressed unit data B in the buffer memory 1233 of the memory controller 123. Since the unit data are processed in parallel, the time T1 required for processing may be reduced when compared to the case of FIG. 1.

As described above referring to FIG. 8, in the case of JPEG 2000 compression, the compressor applies optimization processing, which optimizes the image quality of the compressed image data. For this reason, the time required for compressing unit data may vary from unit data to unit data. Further, since JPEG 2000 compression is based on variable length coding, the size of the compressed unit data may vary from unit data to unit data.

In this example, the memory controller 123 reads out the compressed unit data A from the buffer memory 1231, and stores the compressed unit data A in the second memory space 182 of the main memory 18. Subsequently, the memory controller 123 reads out the compressed unit data B from the buffer memory 1232, and stores the compressed unit data B in the second memory space 182 of the main memory 18 such that the starting address of the compressed unit data B follows the ending address of the compressed unit data A.

For the time period indicated by the arrow in FIG. 8, the buffer memory 1211 is prohibited from being overwritten, for example, by setting the value of flag. When overwriting the buffer memory 1211 is allowed, the buffer memory 1211 stores the unit data E and the unit data F.

By repeating the above-described operation for all unit data of the image data file, the unit data of the image data may be stored in the main memory 18 in the order being read by the image input 11 and in the continuous address range. Further, the pointer generator 124 is provided, which generates the pointer table 183 storing address information of the unit data. With the use of memory controller 123 and the pointer generator 124, random access to the specific unit data may increase. Further, the memory space may be used more efficiently.

For example, in the case of JPEG 2000 compression, image processing may be applied to the selected unit data rather than the entire image data. For example, image rotation or image editing may be applied to the selected unit data. In such case, the CPU 15 may firstly define the unit data to be accessed, and obtains the address information of the unit data from the pointer table 183. Based on the address information, the unit data may be accessed with the reduced time.

In the above-described examples referring to any one of FIGS. 3 to 9, the image compressor 12 is assumed to compress the image data in compliance with JPEG 2000 standard. As described above, the use of JPEG 2000 compression allows the user to apply image processing to a desired portion of the image data such that the only selected portion of the image data needs to be expanded. This may suppress image degradation, which may be otherwise caused due to repeated operation of compressing and expanding. However, JPEG 2000 compression may require a circuit structure that is relatively large in scale and high in cost. Further, the number of operation system (OS) or applications supporting JPEG 2000 standard tends to be less when compared with the number of OS or applications supporting, for example, JPEG standard.

In alternative to JPEG 2000 standard, the image processing apparatus 100 of FIG. 2 may apply the first compression method as described below referring to FIG. 19A. Before describing in detail how the first compression method is applied, JPEG compression or expansion is explained referring to FIGS. 10A, 10B, 13, 14, and 16.

Figures 10A, 10B:
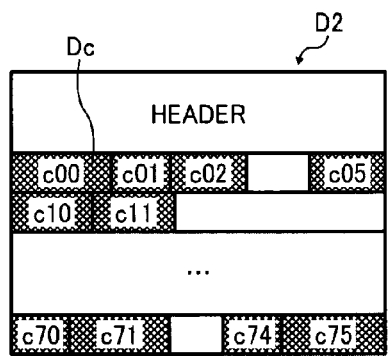
FIG. 10A is a schematic diagram illustrating a data structure of image data before compression, according to an example embodiment of the present invention.
FIG. 10B is a schematic diagram illustrating a data structure of compressed image data of FIG. 10A, according to an example embodiment of the present invention.

In this example, as illustrated in FIG. 10A, the image data D1 to be processed is assumed to have a size of 48 pixels by 64 pixels, with each pixel having 24 bits. Since the image data D1 is RGB image data, each pixel contains 8 bits for each color of red, green and blue.

The image data D1 of FIG. 10A includes the pixels p00 to p77, which may be collectively referred to as "P". The pixels P of the image data D1 are classified into a plurality of blocks b00 to b75, which may be collectively referred to as "B". In JPEG compression, one block includes 8 pixels by 8 pixels.

FIG. 10B illustrates a data structure of JPEG compressed image data D2 of the image data D1 of FIG. 10A. Referring to FIG. 10B, the compressed image data D2 includes a header section, and compressed coded blocks c00 to c75, which may be collectively referred to as "Dc". In JPEG compression, which is based on variable length coding, the size of the compressed coded blocks Dc may vary. Further, the compressed coded blocks Dc are arranged by line. Further, in JPEG compression, the image data D1 is applied with discrete cosine transformation (DCT) conversion to generate a spatial frequency spectrum. More specifically, compression is achieved by compressing the difference between two adjacent DC components. For this reason, the adjacent coded blocks Dc are related.

When compressing the image data D1, the header section storing information regarding the image size, compression settings, compression table, etc. is generated. Referring to FIG. 10A, the blocks B are coded in the order from the upper left to the lower right, and stored as the coded blocks Dc in the memory space following the header section.

When expanding the compressed image data D2, the header section is read to obtain information regarding the image size, compression settings, compression table, etc. Based on the information obtained from the header section, the coded blocks Dc of the compressed image data D2 are expanded in the order in which the blocks are coded. As described above, since the adjacent blocks Dc are related, it is important to expand the coded blocks Dc in the order in which the blocks B are coded. Accordingly, JPEG compression does not allow random access to a desired portion of the compressed image data or selectively applying expansion to a desired portion of the compressed image data.

Figure 13:
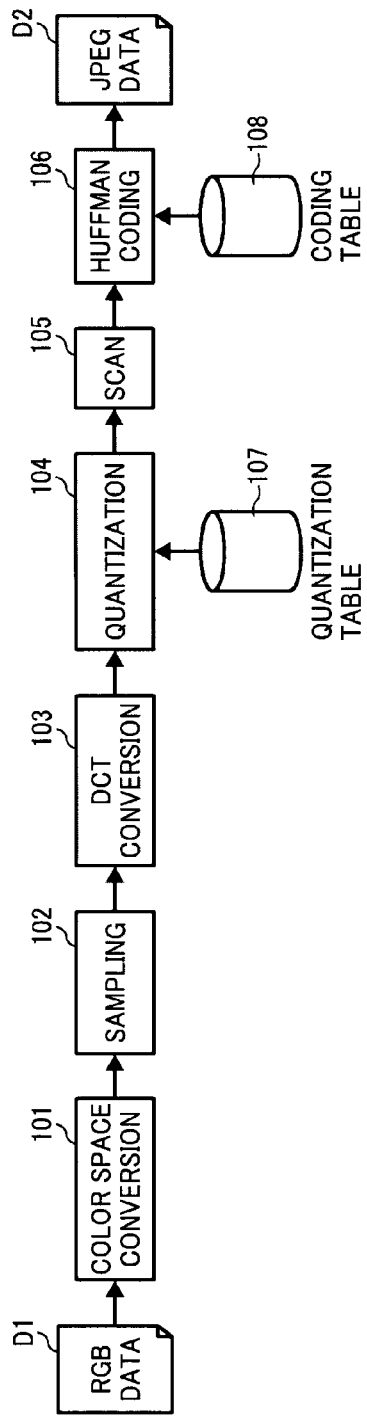
FIG. 13 is a schematic block diagram illustrating an example structure of a compressor capable of compressing image data in compliance with JPEG standard.

Referring now to FIGS. 10A, 10B, 13, and 14, operation of compressing the image data D1 of FIG. 10A in compliance with JPEG standard is explained. Referring to FIG. 13, a compressor includes a color space conversion unit 101, a sampling unit 102, a DCT conversion unit 103, a quantization unit 104, a scan unit 105, a Huffman coding unit 106, a quantization table 107, and a coding table 108.

The color space conversion unit 101 applies color space conversion to the image data D1 of FIG. 10. Each block B of FIG. 10A is converted from RGB to a different color space such as YUV or YcbCr. For the descriptive purpose, in this example, it is assumed that YUV color image data is generated, with Y corresponding to the brightness of the pixel, U corresponding to the blue chrominance of the pixel, and V corresponding to the red chrominance of the pixel.

After applying color space conversion, the sampling unit 102 applies sampling to the YUV image data. As the human eye is more sensitive to the brightness of the image data than the chrominance of the image data, the spatial resolution of the chrominance of the image data is reduced. For example, in order to change the ratios of YUV components from 4:4:4 to 4:1:1, the UV components are downsampled in horizontal and vertical directions such that one block of UV components are obtained while four blocks of Y components are obtained. For simplicity, in this example, the ratios of YUV components are assumed to be 4:4:4. In such case, one block of Y components, one block of U components, and one block of V components are treated as one processed unit, which may be referred to as a minimum coded unit (MCU).

For each component block of the MCU, the DCT conversion unit 103 applies DCT conversion to generate a set of 64 values, which may be refereed to as DCT coefficients. One coefficient located at the upper left corner of the block B is referred to as a DC coefficient, while the remaining 63 coefficients are referred to as AC coefficients.

The quantization unit 104 applies quantization to each one of the 64 coefficients obtained by quantization. For example, each coefficient may be divided by a constant, which is previously defined for that coefficient, and rounded to the nearest integer. The constant is stored in a quantization table 107.

Figure 14:
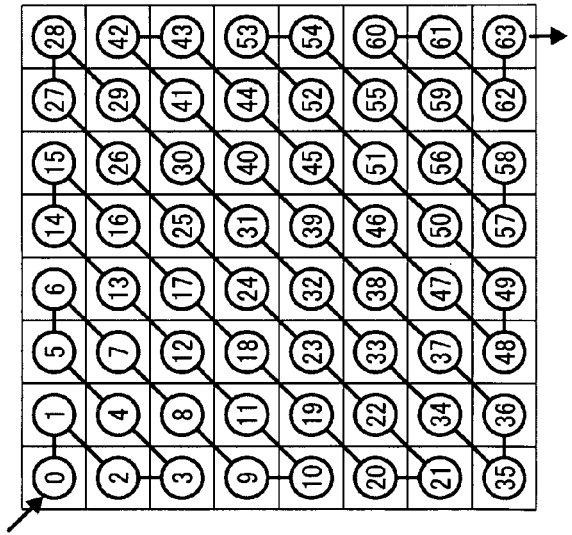
FIG. 14 is an illustration for arranging a plurality of coefficients in the zig-zag order.

At the scan unit 105, the quantized coefficients of the block B are arranged in a predetermined order. As illustrated in FIG. 14, the quantized AC coefficients are scanned in a zigzag order to be rearranged in one line. Referring to FIG. 14, the quantized DC coefficient, which has the value of 0, is not scanned.

The Huffman coding unit 106 applies entropy coding, such as Huffman coding, to each block B of the MCU using information obtained from a coding table 108. For example, in order to code the MCU image data, the DC coefficient of Y components is firstly coded. Subsequently, AC coefficients of Y components are coded. Subsequently, the DC coefficient of U components, the AC coefficients of U components, the DC coefficient of V components, and the AC coefficients of V components are coded in this order.

As described above, the previous quantized DC coefficient is used to predict the current quantized DC coefficient such that the difference between the previous and current DC coefficients is encoded. For example, in order to encode the DC coefficient of Y component of the block b01 of FIG. 10A, the difference between the DC coefficient of Y component of the block b01 and the DC coefficient of Y component of the block b00 is encoded. If there is no previous DC coefficient, for example, in the case of encoding the DC coefficient of the block b00, the value of the previous DC coefficient is assumed to be 0.

When storing the coded blocks Dc in the memory, the coded blocks Dc are stored following the header section.

Figure 16:
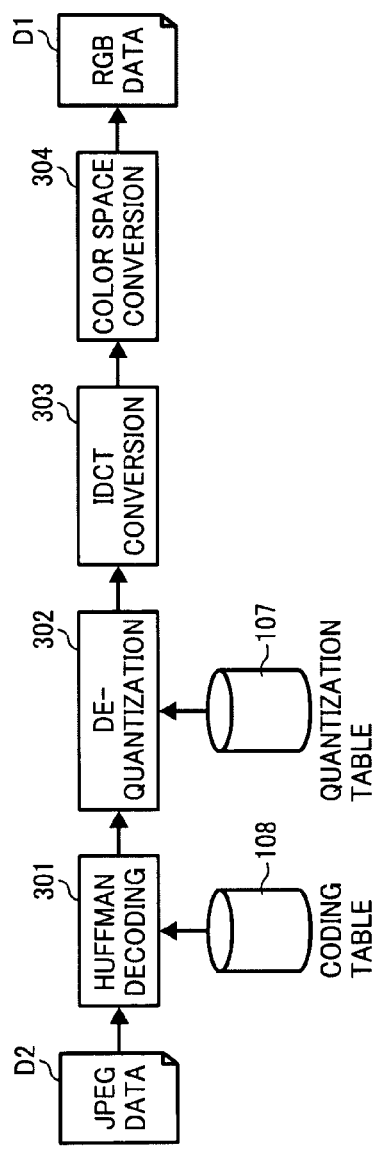
FIG. 16 is a schematic block diagram illustrating an example structure of an expander capable of expanding JPEG compressed image data.

Referring now to FIGS. 10A, 10B, and 16, operation of expanding the JPEG compressed image data D2 of FIG. 10B is explained. Referring to FIG. 16, an expander includes a Huffman decoding unit 301, a dequantization unit 302, an IDCT conversion unit 303, and a color space conversion unit 304.

From the compressed data D2, the header section is read out to obtain information regarding the compressed image data D2 such as information regarding the image size or information needed for decoding. The information needed for decoding may include information stored in the coding table 108 and the quantization table 107.

Referring to the coding table 108, the Huffman decoding unit 301 decodes the coded coefficients of each MCU of the compressed image data.

Referring to the quantization table 107, the dequantization unit 302 dequantizes the quantized coefficients, which are arranged in the predetermined order. Further, from the difference between the previous and current DC coefficients, the value of DC coefficient is obtained for each block.

The IDCT conversion unit 303 transforms the DCT coefficients to an 8 by 8 block of samples by applying the inverse DCT.

The color space conversion unit 304 converts the image data, which is in YUV format, to the image data in RGB format.

As described above, since the adjacent coded blocks Dc are related, the entire image data needs to be expanded before applying image processing to the compressed image data D2. For example, the compressed image data D2 of FIG. 10B may be stored in a storage device, for example, in the HDD 19 of the image processing apparatus 100 of FIG. 1. The user may desire to apply image processing, such as editing, to the compressed image data D2. In one example, the user may desire to rotate the compressed image data D2, for example, in preparation for printing. In another example, the user may desire to add a stamp to a portion of the compressed image data D2. In such case, the entire image data D2 is firstly expanded.

Figure 11A:
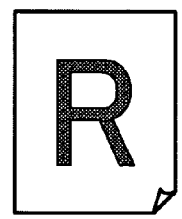
FIG. 11A is an illustration for explaining image data rotated by 0 degree, according to an example embodiment of the present invention.
Figure 11B:
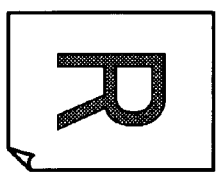
FIG. 11B is an illustration for explaining image data rotated by 90 degrees, according to an example embodiment of the present invention.
Figure 11C:
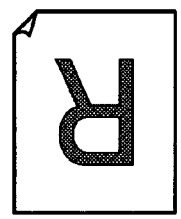
FIG. 11C is an illustration for explaining image data rotated by 180 degrees, according to an example embodiment of the present invention.
Figure 11D:
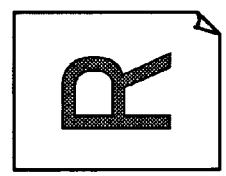
FIG. 11D is an illustration for explaining image data rotated by 270 degrees, according to an example embodiment of the present invention.

Referring now to FIGS. 11A to 11D and 12A to 12D, operation of rotating the image data D2, which is JPEG compressed, is explained. As illustrated in FIG. 11A to 11D, the image processing apparatus 100 may be requested to rotate the image data D2 to be rotated by 0 degree (FIG. 11A), 90 degrees (FIG. 11B), 180 degrees (FIG. 11C), or 270 degrees (FIG. 11D). In such case, after expanding the JPEG compressed image data D2 by the image expander 13 (FIG. 2), the image processor 16 may read the expanded image data D1 in the order specified by the rotation angle to subsequently output the sections of the expanded image data. In this example, the rotation angle is defined in the clockwise direction. Alternatively, the rotation angle may be defined in the counter-clockwise direction.

Figure 12A:
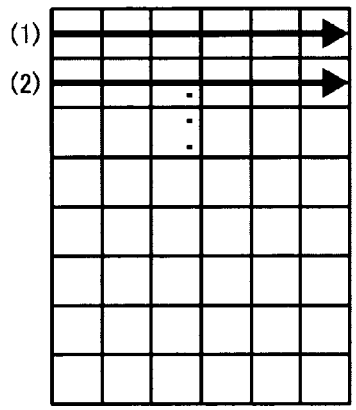
FIG. 12A is an illustration for explaining reading expanded image data in order to output the image data shown in FIG. 11A.

In one example, when the image data D2 is to be rotated by 0 degree as illustrated in FIG. 11A, as illustrated in FIG. 12A, the expanded image data D1 is read in the order from the upper left pixel, which is the pixel p00 of FIG. 10A, to the upper right pixel to complete reading one line of the image data D1. The portion of the image data D1 being read is subsequently output to the image output 14. This is repeated for all lines of the image data D1 such that the image data D1 having the rotation angle of 0 degree is output by the image output 14.

Figure 12B:
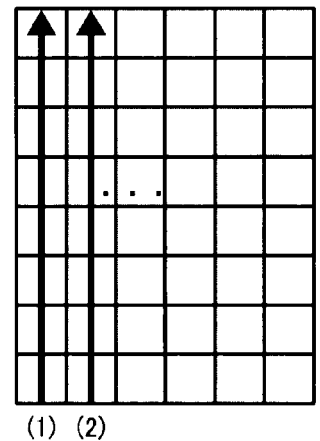
FIG. 12B is an illustration for explaining reading expanded image data in order to output the image data shown in FIG. 11B.

In another example, when the image data D2 is to be rotated by 90 degrees as illustrated in FIG. 11B, as illustrated in FIG. 12B, the expanded image data D1 is read in the order from the lower left pixel, which is the pixel p70 of FIG. 10A, to the upper left pixel to complete reading one line of the image data D1. The portion of the image data D1 being read is subsequently output to the image output 14. This is repeated for all lines of the image data D1 such that the image data D1 having the rotation angle of 90 degrees is output by the image output 14.

Figure 12C:
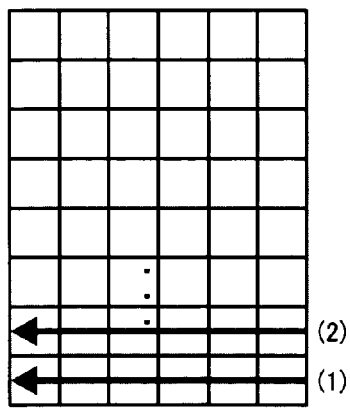
FIG. 12C is an illustration for explaining reading expanded image data in order to output the image data shown in FIG. 11C.

In another example, when the image data D2 is to be rotated by 180 degrees as illustrated in FIG. 11C, as illustrated in FIG. 12C, the expanded image data D1 is read in the order from the lower right pixel, which is b77 of FIG. 10A, to the lower left pixel to complete reading one line of the image data D1. The portion of the image data D1 being read is subsequently output to the image output 14. This is repeated for all lines of the image data D1 such that the image data D1 having the rotation angle of 180 degrees is output by the image output 14.

Figure 12D:
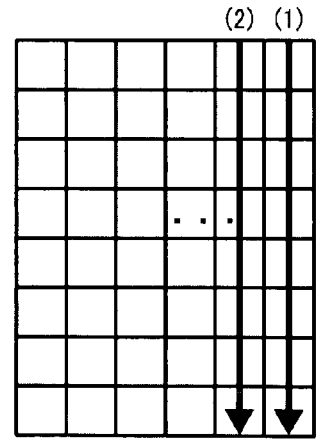
FIG. 12D is an illustration for explaining reading expanded image data in order to output the image data shown in FIG. 11D.

In another example, when the image data D2 is to be rotated by 270 degrees as illustrated in FIG. 11D, as illustrated in FIG. 12D, the expanded image data D1 is read in the order from the upper right pixel, which is p07 of FIG. 10A, to the lower right pixel to complete one line of the image data D1. The portion of the image data D1 being read is subsequently output to the image output 14. This is repeated for all lines of the image data D1 such that the image data D1 having the rotation angle of 270 degrees is output by the image output 14.

As described above, since the pixel is read only after all pixels of the compressed image data D2 are expanded, the order in which the image data is being expanded and output to the image processor 16, and the order in which the image data is being read and output by the image processor 16 may differ depending on the rotation angle, thus the processing speed may differ depending on the rotation angle. For example, in the case of the image data to be rotated by 90 degrees, while the lower left block b70 is firstly needed, the lower left block b70 is expanded only after the blocks that are located above the lower left block b70 are expanded. In another example, in the case of the image data to be rotated by 180 degrees, while the lower right block b75 is firstly needed, the lower right block b75 is expanded only after the blocks that are located above the lower right block b75 are expanded. This is partly because the order of reading the image data for expansion cannot be changed since the adjacent blocks are related. Further, random access to a desired portion of the image data is not allowed. With this limitation, JPEG compression suffers from the reduced processing speed especially when editing is applied.

In addition to the reduced processing speed, in the case of JPEG compression, the memory resource that sufficiently stores at least one page of image data may be needed, thus increasing the overall cost. For example, for the A4 size image data with 600 dpi resolution, about 100 MB of memory space is required. Further, when compressing is applied after editing, image quality may be degraded.

One or more of the above-described problems may apply to an example case in which stamping is to be applied to the image data. Even when a stamp is to be applied to a selected portion of the image data, the entire image data needs to be firstly expanded in the order in which the image data is coded. For example, referring to FIGS. 17A and 17B, the image processing apparatus 100 may be requested to add a mark M (FIG. 17B) to a selected portion of the image data of FIG. 17A. In such case, the entire image data of FIG. 17A needs to be expanded.

In view of the above, the image processing apparatus 100 of FIG. 2 may use the first compression method according to an example embodiment of the present invention, which is described below referring to FIG. 19A. The first compression method is substantially similar to the above-described JPEG compression method except that the coefficients are coded based on the original values. Compared to JPEG compression, the first compression method does not encode the difference between two adjacent DC components. More specifically, when coding is applied by the Huffman coding unit 105 of FIG. 13, the DC coefficient is encoded based on its original value.

FIG. 18 illustrates a set of DC coefficients for Y component of one block B obtained after quantization. FIG. 19A illustrates a set of DC coefficients before applying Huffman coding according to an example embodiment of the present invention. FIG. 19B illustrates a set of DC coefficients before applying Huffman coding according to the JPEG standard, as described above referring to FIG. 13. As illustrated in FIGS. 18 and 19B, in JPEG compression, the difference between the DC coefficients that are adjacent with each other is encoded based on Huffman coding. In contrary, as illustrated in FIGS. 18 and 19A, in this example, the original value of the DC coefficient is encoded based on Huffman coding. Since the blocks B are coded independently from one another, random access to the desired block B may be applicable.

Alternatively, in order to keep the original value for each DC coefficient, a restart (RST) marker may be inserted between two adjacent MCUs of the compressed image data. Before scanning the MCU, the RST marker clears the accumulated value, such as the value of the DC coefficient of the preceding MCU. In this manner, the original value of DC coefficient is encoded for each MCU. This technique may however require memory space. For example, assuming that one RST marker requires 2 bytes, about 1 MB of memory space is required for RST markers in order to encode the A4 size, 600 dpi image data having about 540,000 MCUs.

Figure 15:
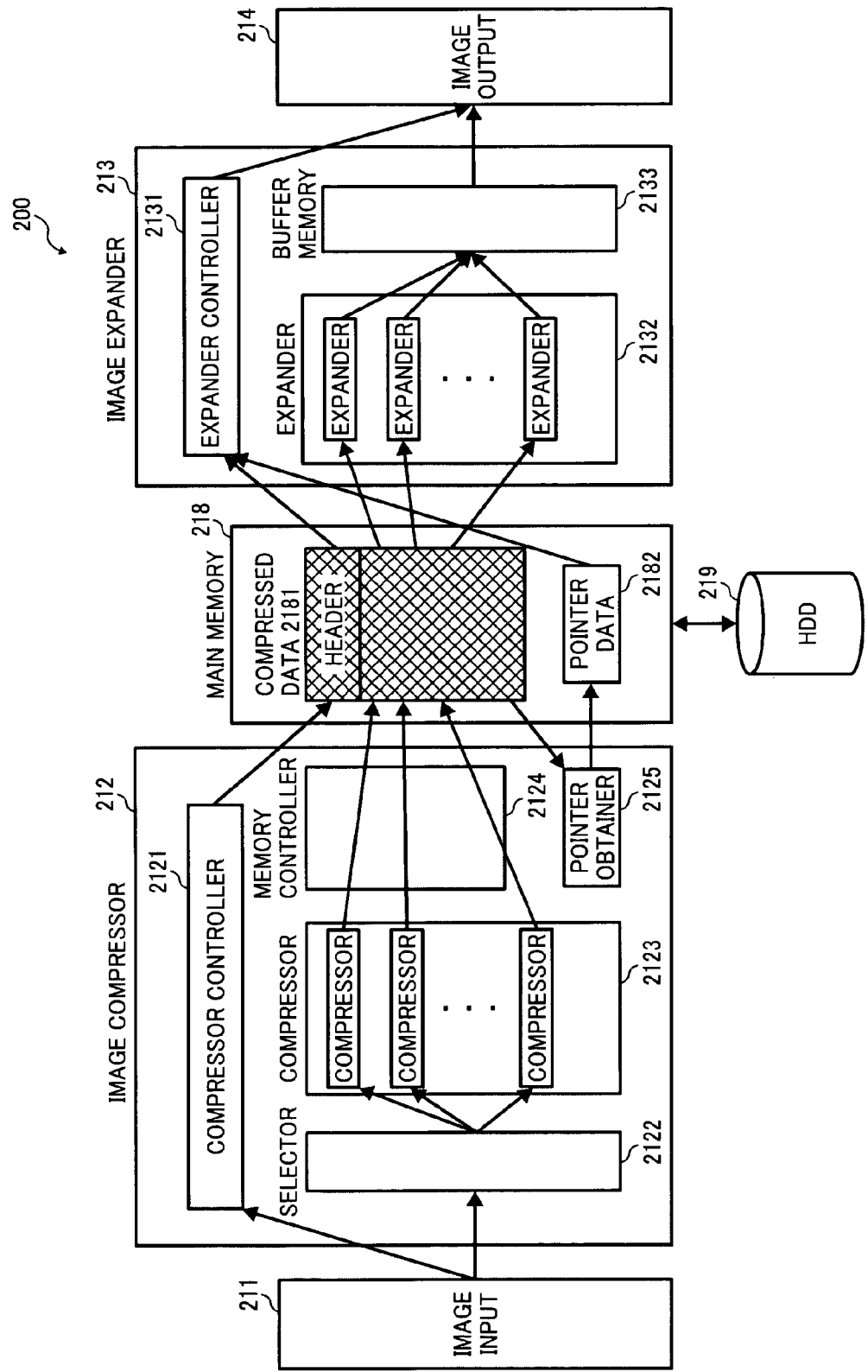
FIG. 15 is a schematic block diagram illustrating an example structure of an image processing apparatus, according to an example embodiment of the present invention.

Referring now to FIG. 15, an example structure of an image processing apparatus 200 is explained according to an example embodiment of the present invention. The image processing apparatus 200 includes an image input 211, an image compressor 212, a main memory 218, a HDD 219, an image expander 213, and an image output 214. The image processing apparatus 200 is substantially similar in structure and function to the image processing apparatus 100 of FIG. 2. The differences include the addition of a controller device in each one of the image compressor 212 and the image expander 213 in replace of the CPU 15. Referring to FIG. 15, an image processor corresponding to the image processor 16, a user interface corresponding to the user interface 17, and an I/O interface corresponding to the I/O interface 20 are not provided. Alternatively, any one of the image processor, the user interface, and the I/O interface may be provided.

The image input 211 is substantially similar in structure and function to the image input 11 of FIG. 2.

The image compressor 212 includes a compressor controller 2121, a selector 2122, a compressor 2123, a memory controller 2124, and a pointer obtainer 2125.

The main memory 218 is substantially similar in structure and function to the main memory 18 of FIG. 2. In this example, the main memory 218 stores compressed data 2181 and pointer data 2182. The pointer data 2182 may correspond to the pointer table 183 described above referring to any one of FIGS. 3, 5, 6, 7, and 9.

The HDD 219 is substantially similar in structure and function to the HDD 19 of FIG. 2.

The image expander 213 includes an expander controller 2131, an expander 2132, and a buffer memory 2133. In this example, the expander 2132 is provided with a plurality of expanders. Alternatively, only one expander may be provided.

The image output 214 is substantially similar in structure and function to the image output 14 of FIG. 2.

The image processing apparatus 200 may compress image data, or expand compressed image data, in a substantially similar manner as described above referring to FIGS. 2 to 9. In the following examples, the image processing apparatus 200 is assumed to compress the image data using the first compression method. In order to apply the first compression method, at least one of the compressor of the image compressor 212 may have a structure shown in FIG. 24.

Figure 24:
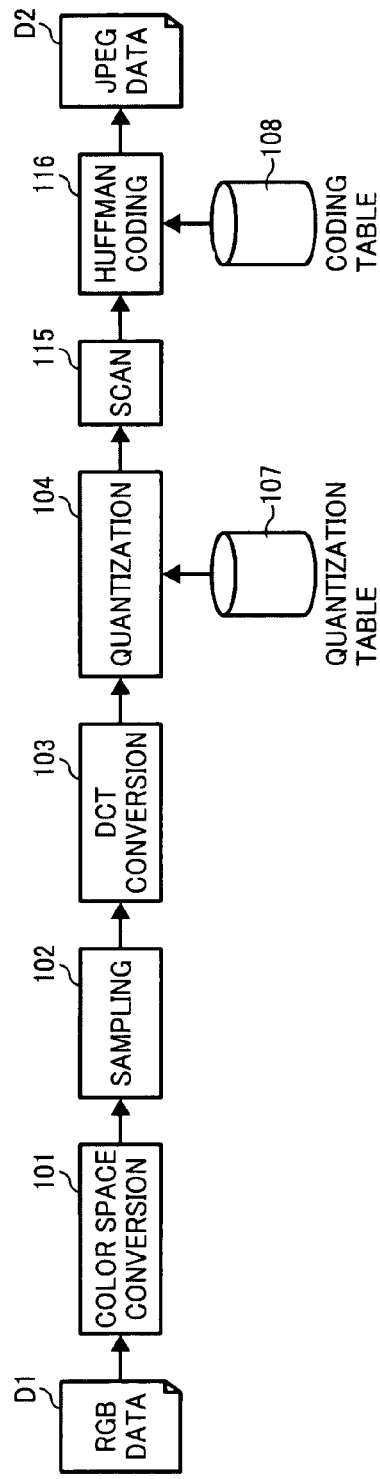
FIG. 24 is a schematic block diagram illustrating an example structure of an expander capable of compressing image data in compliance with a compression method of FIG. 19A.

The compressor of FIG. 24 is substantially similar in structure and function to the expander of FIG. 13. The differences include the replacement of the scan unit 105 with a scan unit 116, and the replacement of the Huffman coding unit 106 with a Huffman coding unit 116. As described above referring to FIGS. 18 and 19A, the Huffman coding unit 116 encodes the DC coefficient for each block based on its original value. For this reason, calculation of the difference before encoding, which may be performed in the case of JPEG compression, is not required.

Figure 25:
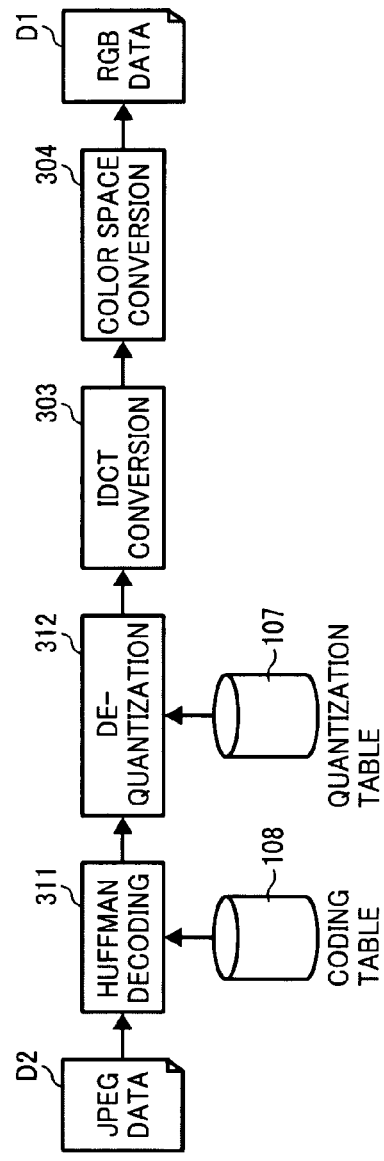
FIG. 25 is a schematic block diagram illustrating an example structure of an expander capable of expanding compressed image data that is compressed using the compression method of FIG. 19A.

Further, in order to expand the compressed image data compressed using the first compression method, at least one of the expander of the image expander 213 may have a structure shown in FIG. 25.

The expander of FIG. 25 is substantially similar in structure and function to the expander of FIG. 16. The differences include the replacement of the Huffman decoding unit 301 with a Huffman decoding unit 311, and the replacement of the dequantization unit 302 with a dequantization unit 312. The Huffman decoding unit 311 decodes the coded coefficients of each MCU of the compressed image data. The dequantization unit 312 dequantizes the quantized coefficients. Since the original value of the DC coefficient is used for encoding, the value of DC coefficient may be directly used after decoded and dequantized.

In example operation of compressing image data, the image input 211 reads an original document into image data in RGB format. The selector 2122 of the image compressor 212 divides the image data into unit data, for example, into a plurality of blocks each having a predetermined number of pixels. In this example, each pixel is assumed to contain 8 pixels by 8 pixels. The compressor 2123 compresses the plurality of blocks independently from one another using the first compression method such that the original value is used to encode the DC coefficient for each block. As shown in FIG. 15, the compressor 2123 may be provided with a plurality of compressors such that a plurality of blocks may be compressed in parallel. In such case, the compressor controller 2121 may assign each block to the corresponding one of the compressors of the compressor 2123. Further, the compressor controller 2121 may manage operation of compressing, such as the order of the unit data to be processed or the timing for compressing. Alternatively, the compressor 2123 may be provided with only one compressor, which is capable of processing a plurality of blocks in serial.

The compressed blocks, which may be collectively referred do as the compressed data 2181, are stored in the main memory 218. Referring to FIG. 15, the compressed data 2181 includes a header section, which is generated by the compressor controller 2121 based on information regarding the image data. Alternatively, any other component of the image compressor 212 or any other functional unit such as a CPU may generate the header section. Following the header section, the compressed coded blocks are stored in the main memory 218. In this example, the memory controller 2124 causes the coded blocks to be stored in the order being obtained by the image input 211 and in the continuous address range.

Further, the pointer obtainer 2125, which corresponds to the pointer generator 124, may generate pointer data, which indicates the address at which the compressed coded block is stored in the main memory 218. The pointer data 2182 may be expressed in terms of physical address on the memory space or the data size of the coded block. When the pointer data 2182 is expressed in data size, the position of the coded block may be obtained by adding the value of accumulated data size from the first coded block to the preceding coded block, to the address of the first coded block. Alternatively, the pointer data 2182 may be expressed in accumulated data size from the first coded block to the preceding coded block. The pointer data 2182 may be stored in the main memory 218 in a corresponding manner with the compressed image data 2181. In this example, the pointer data 2182 may be stored as a file independently of the file of the compressed image data 2182. Alternatively, the pointer data 2182 may be stored as a part of the compressed image data 2181, for example, in the header section.

The compressed image data 2181 and the pointer data 2182 may be copied onto the HDD 219 or any other storage device or medium. Alternatively, when the I/O interface is provided, the compressed image data 2181 and the pointer data 2182 may be output to the outside apparatus via the I/O interface.

In example operation of expanding the compressed image data 2181 stored in the HDD 219, the compressed image data 2181 and the pointer data 2182 are copied from the HDD 219 onto the main memory 218. This operation of copying may be performed when the compressed image data 2181 and the pointer data 2182 are not stored in the main memory 218.

The expander controller 2131 reads out the header section of the compressed image data 2181, and obtains information regarding the image data or any information that may be needed for image expansion such as quantization table or coding table. Further, the expander controller 2131 reads out the pointer data 2182 to obtain the address information of each compressed coded block.

The expander controller 2131 assigns each compressed coded block to the corresponding one of the expanders of the expander 2132 based on the address information of each compressed coded block. The expander 2132 expands the compressed coded block into expanded block, and stores the expanded block in the buffer memory 2133. The expander controller 2131 may manage operation of expanding so as to cause the expanded blocks to be stored in the buffer memory 2133 in the predetermined order. Further, the expander controller 2131 may control the timing for processing. In another example, the expander controller 2131 may define a portion of the compressed image data 2181 to be processed. The expanded blocks, or the expanded image data, is output to the image output 214 in RGB format.

The image output 214 converts the image data from RGB format to CMYK format, and forms an image on a recording medium according to the CMYK image data.

In the above-described example, the pointer data 2182 is obtained by the expander controller 2131. Alternatively, the pointer data 2182 may not be obtained. For example, when only one expander of the expander 2132 is used to expand the entire compressed image data 2181, the image data 2181 may be expanded in a predetermined order, for example, starting from the upper left corner of the image data.

Referring now to FIGS. 10A, 10B, 12A to 12D, and 15, operation of outputting the image data after applying image rotation is explained, according to an example embodiment of the present invention. For the illustrative purpose, the image processing apparatus 200 of FIG. 15 is requested to output the compressed image data after rotating the compressed image data by 90 degrees as illustrated in FIG. 11B. The request may be input by the user through the user interface or the I/O interface. Further, in this example, the compressed image data is assumed to be stored in the HDD 219 as the compressed image data 2181 together with the pointer data 2182.

Referring to FIG. 15, the compressed image data 2181 and the pointer data 2182 are copied from the HDD 219 onto the main memory 218. The expander controller 2131 of the expander controller 213 reads out the header section of the compressed image data 2181, and obtains information regarding the image data or any information that may be needed for image expansion such as quantization table or coding table. Further, the expander controller 2131 reads out the pointer data 2182 to obtain the address information of each compressed coded block.

The expander controller 2131 assigns each compressed coded block to the corresponding one of the expanders of the expander 2132 based on the address information of each compressed coded block. In this example, the expander controller 2131 causes the expander 2132 to expand in the order shown in FIG. 12B. Since the image data is to be rotated by 90 degrees, the block b70, which is located at the lower left, is obtained based on the pointer data, and assigned to the first expander of the expander 2132. Subsequently, the block b60 is obtained based on the pointer data, and assigned to the second expander of the expander 2132. In this manner, the order in which the image data is expanded and output by the expander 2132 matches the order in which the image data is output to the image output 214. More specifically, the expanded image data is output to the buffer memory 2133 to be stored in the order defined by the rotation angle, and output to the image output in the order defined by the rotation angle. Since the image data is compressed using the first compression method of FIG. 19A, the image data may be expanded from any desired block despite the order in which the image data is compressed.

After expanding the blocks, the expander 2132 stores the expanded blocks in the buffer memory 2133. In this example, the buffer memory 2133 may include any number of buffer memories or any number of buffer memory spaces, each assigned to one of the expanders of the expander 2132. For the increase processing speed, however, the buffer memory 2133 may preferably include more than one buffer memory or memory space.

For example, the buffer memory 2133 may include two buffer memories or two buffer memory spaces, each assigned to one of the expanders of the expander 2132. In such case, when eight expanders are provided in the expander 2132, the buffer memory 2133 may be divided into 16 memory spaces. Two of the 16 memory spaces may be assigned to one of the eight expanders of the expander 2132. Further, in this example, the size of the memory space may be designed so as to sufficiently store at least one block after being expanded. For example, in the case of processing the RGB image data, the block having 8 pixels by 8 pixels has the data size of 192 bytes. The data size of the memory space is designed to be at least 192 bytes, which results in the overall size of the buffer memory 2133 to be at least 3072 bytes. Since each expander is provided with more than one memory space, as long as when one block is expanded and stored in the buffer memory 2133, next block may be expanded without waiting for the block stored in the buffer memory 2133 to be output to the image output 214. Further, since eight expanders of the expander 2132 are able to apply processing concurrently, the overall processing speed required for expanding may increase.

In this example, the expander controller 2131 controls operation of each expander of the expander 2132, for example, by assigning the compressed coded block to the expander or by controlling the timing to start processing. Further, in this example, the expander controller 2131 causes the plurality of blocks of the image data to be in the order such that, when the image data is output, the image data is rotated by 90 degrees. More specifically, the expander controller 2131 causes the plurality of blocks to be in the order from the lower left block b70 to the upper right block b05, as illustrated in FIG. 12B.

The image output 214 converts the expanded image data from RGB format to CMYK format, and forms an image on a recording medium according to the CMYK image data.

As described above, in this example, in order to output the image data that is rotated by 90 degrees, the memory is not required to have the size that sufficiently stores the image data of one page. For example, assuming that the A4 size, 600 dpi image data, which has the data size of about 100 MB, is processed, when the expander 2132 is provided with eight expanders with each expander being assigned with two memory spaces of the buffer memory 2133, 3072 bytes are required. In another example, when the expander 2132 is provided with four expanders with each expander being assigned with two memory spaces of the buffer memory 2133, 1536 bytes are required.

Further, when a plurality of expanders are provided to the expander 2132, a plurality of blocks are processed in parallel such that the overall processing speed may increase.

Figure 17A:
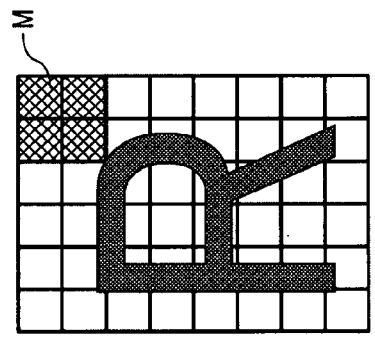
FIG. 17A is an illustration of example image data.
Figure 17B:
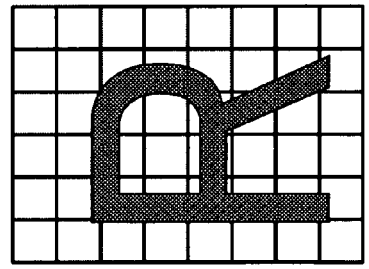
FIG. 17B is an illustration of example image data generated by adding a stamp to the image data of FIG. 17A.

Referring now to FIGS. FIG. 15, 17A, and 17B, operation of outputting the image data after adding a stamp is explained, according to an example embodiment of the present invention. In this example, the image processing apparatus 200 adds the mark M (FIG. 17B) to the image data of FIG. 17A to generate the image data of FIG. 17B. The image data of FIG. 17A, which is assumed to be compressed using the first compression method, may be stored in the HDD 219 as the compressed image data 2181 together with the pointer data 2182. Further, in this example, the image processing may be provided, which is capable of performing stamping function.

The compressed image data 2181 and the pointer data 2182 are copied from the HDD 219 onto the main memory 218. The expander controller 2131 reads out the header section of the compressed image data 2181, and obtains information regarding the image data or any information that may be needed for image expansion such as quantization table or coding table.

Further, the expander controller 2131 defines a portion of the image data of FIG. 17A to which the mark M is to be added. As illustrated in FIG. 17B, the mark M is to be added to four blocks located at the upper right corner of the image data of FIG. 17A. The mark M may be stored in any storage device, such as the HDD 219. Assuming that the image data of FIG. 17A has a data structure of FIG. 10A, these blocks are the block b04, the block b05, the block b14, and the block b15. The expander controller 2131 reads out the pointer data 2182 to obtain the address information of each compressed coded blocks b04, b05, b14, and b15. In another example, operation of defining the portion of the image data to be processed may be performed by another functional unit such as the CPU.

The expander controller 2131 assigns each compressed coded block to the corresponding one of the expanders of the expander 2132 based on the address information of each compressed coded block. The expander 2132 expands the compressed coded block, that is assigned, and stores the expanded block in a predetermined memory space of the buffer memory 2133.

When all four blocks are expanded, the image processor adds the mark M to the portion of the image data including the blocks b04, b05, b14, and b15, and output the processed portion of the image data including the blocks b04, b05, b14, and b15 to the image compressor 212.

The image compressor 212 applies compression to the processed portion of the image data including the blocks b04, b05, b14, and b15 in a substantially similar manner as described above referring to FIG. 15, using the first compression method. In this example, only the compressed coded blocks b04, b05, b14, and b15, which correspond to the processed portion of the image data, are changed, for example, by overwriting the previously stored compressed coded blocks b04, b05, b14, and b15. The header section may not be changed depending on the processing applied to the portion of the image data. Further, for the unprocessed portion of the image data, the compressed coded blocks are not changed.

When the data size of the compressed coded blocks b04, b05, b14, and b15 increases after adding the mark M, the compressed coded blocks b04, b05, b14, and b15 being processed are stored following the last compressed coded block that is unprocessed. In such case, the pointer data 2182 is changed to reflect the updated address information of the coded blocks b04, b05, b14, and b15. The compressed data 2181 and the pointer data 2182 may be copied from the main memory 218 onto the HDD 219.

As described above, since the compressed image data is compressed using the first compression method, in order to apply stamping, such as by adding a mark to a selected portion of the image data, the entire image data does not have to be expanded. This may increase the overall processing speed while reducing the memory space required for processing.

In alternative to generating the image data of FIG. 17B by adding the mark M to the image data of FIG. 17A, operation of overwriting the mark M of the image data of FIG. 17B when printing the image data of FIG. 17B may be performed by the image processing apparatus 200 in a substantially similar manner as described above.

For example, the mark M may be a code, such as a barcode, which contains identification information. When the image data of FIG. 17B is generated as described above, the mark M contains identification information indicating that the image data of FIG. 17B is original. When the image data of FIG. 17B is firstly printed onto the recording medium after being generated, the information of the mark M is not changed. When the printed sheet of the image data of FIG. 17B is copied so as to generate another printed sheet, the information of the mark M may be changed so as to indicate that the newly-created printed sheet is the copy. In such case, the mark M containing the original information ("the original mark M") is overwritten by the mark M containing the updated information ("the updated mark M").

In operation, the image input 211 reads the original document, which is the printed sheet of the image data of FIG. 17B, into the image data. The image compressor 212 compresses the image data into the compressed image data using the first compression method to generate the compressed image data 2181 and the pointer data 2182, and stored the compressed image data 2181 and the pointer data 2182 in the main memory 218.

When reading, the CPU, or any other processor, may determine whether to change the information of the original mark M, for example, by analyzing the information contained in the original mark M. When it is determined that the original mark M needs to be changed to the updated mark M, the following operation is performed.

The expander controller 2131 reads out the header section of the compressed image data 2181, and obtains information regarding the image data or any information that may be needed for image expansion such as quantization table or coding table.

Further, the expander controller 2131 defines a portion of the image data to which the mark M is added. As illustrated in FIG. 17B, the mark M is added to four blocks located at the upper right corner of the image data. Assuming that the image data of FIG. 17B has a data structure of FIG. 10A, these blocks are the block b04, the block b05, the block b14, and the block b15. The expander controller 2131 reads out the pointer data 2182 to obtain the address information of each compressed coded blocks b04, b05, b14, and b15. In another example, operation of defining the portion of the image data to be processed may be performed by another functional unit such as a CPU.

The expander controller 2131 assigns each compressed coded block to the corresponding one of the expanders of the expander 2132 based on the address information of each compressed coded block. The expander 2132 expands the compressed coded block, that is assigned, and stores the expanded block in a predetermined memory space of the buffer memory 2133.

When all four blocks are expanded, the image processor adds the updated mark M to the portion of the image data including the blocks b04, b05, b14, and b15, and output the processed portion of the image data including the blocks b04, b05, b14, and b15 to the image compressor 212. In this manner, the original mark M is replaced by the updated mark M.

In parallel with the above-described operation, the expander 2132 expands the compressed coded blocks of the other portion of the compressed image data 2181, and stores the expanded blocks in a predetermined memory space of the buffer memory 2133.

The expander controller 2131 causes the plurality of expanded blocks, including the blocks to which the updated mark M is added, to be in the predetermined order when being output to the image output 214. The image output 214 forms an image of the expanded image data on recording medium.

As described above, using the first compression method, the selected portion of the image data may be easily overwritten with the reduced processing time.

In any one of the above-described examples, the image processing apparatus 200 of FIG. 15 is assumed to process the compressed image data that is compressed using the first compression method. However, in some cases, the image data, which is compressed using any other compression method, may need to be processed.

Since the first compression method of FIG. 19A is not based on JPEG standard or any standard, the compressed image data that has been compressed using the first compression method may need to be converted to the compressed image data having a standard format, for example, before transmitting the compressed image data to the outside apparatus.

Further, in order to be able to apply editing to a selected portion of the image data as described above, the compressed image data that has been compressed using JPEG standard or any standard may need to be converted to the image data compressed using the first compression method.

Figure 20:
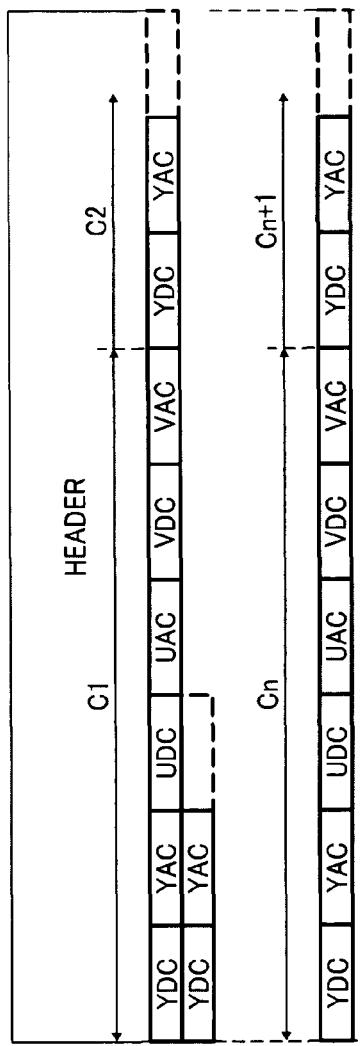
FIG. 20 is an illustration of a data structure of compressed image data generated using the compression method of FIG. 19A.
Figure 21:
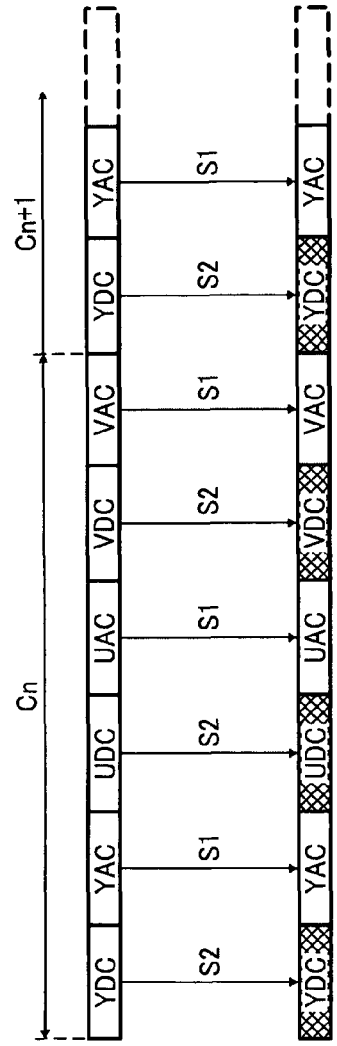
FIG. 21 is an illustration for explaining operation of converting the compressed image data of FIG. 20 to JPEG compressed image data, according to an example embodiment of the present invention.
Figure 22:
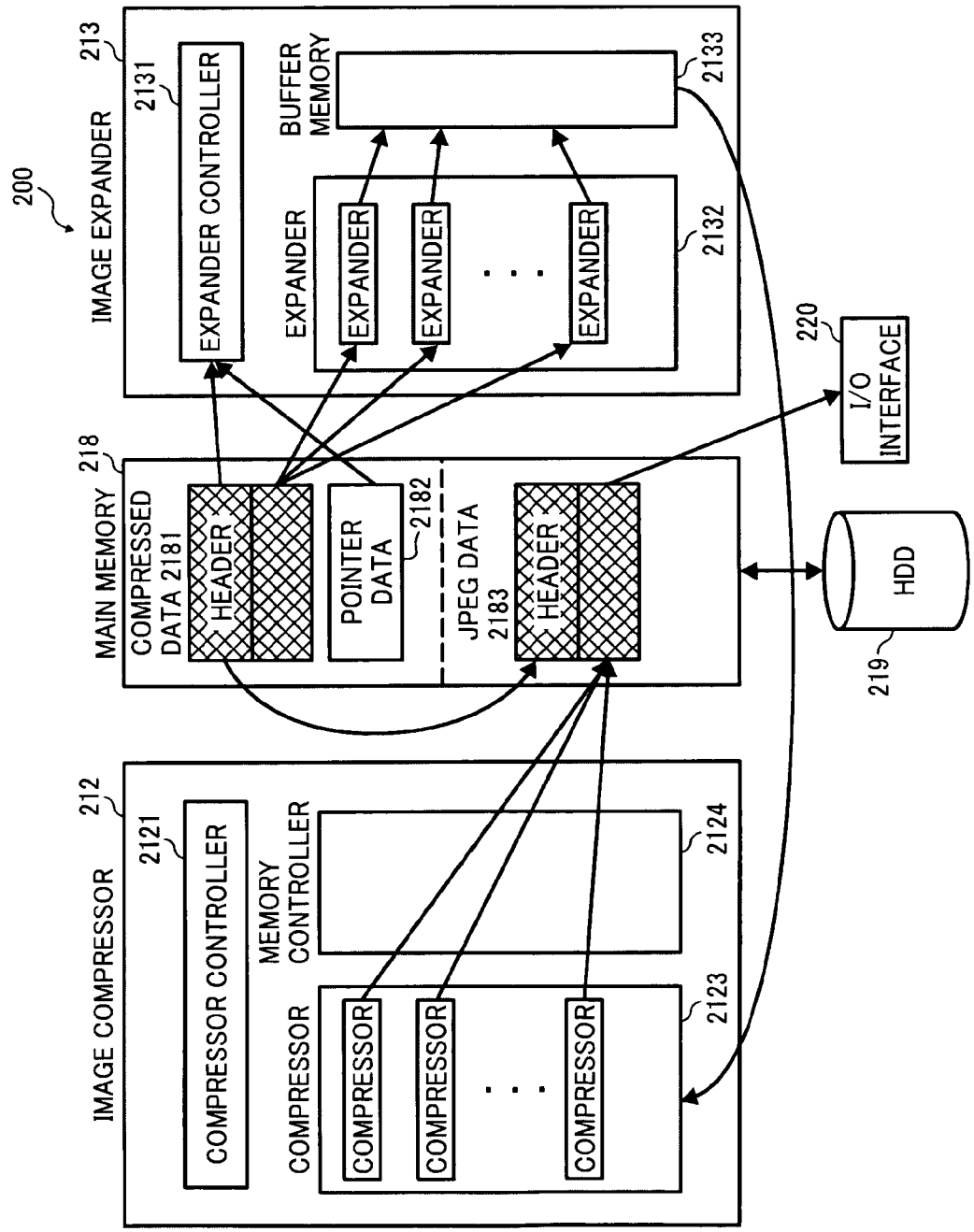
FIG. 22 is a schematic block diagram illustrating a selected portion of the image processing apparatus of FIG. 15, according to an example embodiment of the present invention.

Referring to FIGS. 20, 21, and 22, operation of converting the image data that has been converted using the first compression method of FIG. 19A to JPEG compressed image data and sending the JPEG compressed image data through the network is explained according to an example embodiment of the present invention.

FIG. 20 illustrates a data structure of the compressed image data compressed using the first compression method. In this example, the image data of FIG. 20 includes a header section, and a plurality of compressed coded blocks C1, C2, and Cn+1 following the header section. Each compressed coded block C, which may be referred to as a MCU, includes one block of Y components, one block of U components, and one block of V components. For Y component block, a DC coefficient (YDC) and AC coefficients (YAC) are provided. For U component block, a DC coefficient (UDC) and AC coefficients (UAC) are provided. For V component block, a DC coefficient (VDC) and AC coefficients (VAC) are provided.

FIG. 22 is a selected portion of the image processing apparatus 200. In this example, the I/O interface 220 is additionally provided. In this example, the image processing apparatus 200 is requested to convert the compressed image data that is compressed using the first compression method into the JPEG compressed image data. Further, in this example, the compressed image data of the first compression method is assumed to have the data structure of FIG. 20, and stored in the HDD 219 as the compressed image data 2181 together with the pointer data 2182.

In operation, the compressed image data 2181 and the pointer data 2182 are copied from the HDD 219 onto the main memory 218.

The expander controller 2131 of the expander 213 reads out the pointer data 2182 to obtain the address information of each compressed coded block. The expander controller 2131 assigns each compressed coded block to the corresponding one of the expanders of the expander 2132 based on the address information of each compressed coded block.

Each expander of the expander 2132 expands the compressed coded block, that is assigned, into the expanded block, and sends the expanded block to the image compressor 212 via the buffer memory 2133. In this example, only the DC coefficient of each block is decoded. The AC coefficients of each block are not decoded. In this example, when the expander 2132 is provided with only one expander, the pointer data 2182 may not need to be obtained as the blocks are processed in serial.

The compressor controller 2121 of the image compressor 212 assigns each expanded block to the corresponding one of the compressors of the compressor 2123 based on the address information of each block. Each compressor of the compressor 2123 obtains the difference between the previous DC coefficient and the current DC coefficient, and encodes the difference, in compliance with JPEG standard. In this example, the AC coefficients remains unprocessed as the AC coefficients have been already encoded. For example, referring to FIG. 21, only the DC coefficients are overwritten by the image compressor 212, while the AC coefficients remain the same. In FIG. 21, S1 indicates operation of copying and S2 indicates operation of overwriting.

Further, in this example, the compressor controller 2121 controls operation of compressing, such as the order in which compression is applied. The compressed coded blocks are stored in the main memory 218 together with the header section, as the JPEG compressed image data 2183. The header section of the JPEG compressed image data 2183 may be copied from the header section of the compressed image data 2181.

Once the JPEG data 2183 is generated, the JPEG data 2183 may be sent to the outside apparatus via the I/O interface 220.

As described above, conversion between the JPEG compressed image data and the compressed image data compressed using the first compression method may be easily performed, since only the DC components of the image data need to be changed. Further, as the AC components of the image data are not subject for any processing, image degradation that may be otherwise causes due to repeated operation of compressing or expanding may be suppressed. Further, since only the selected portion of the image data needs to be processed, the overall processing speed may increase.

Figure 23:
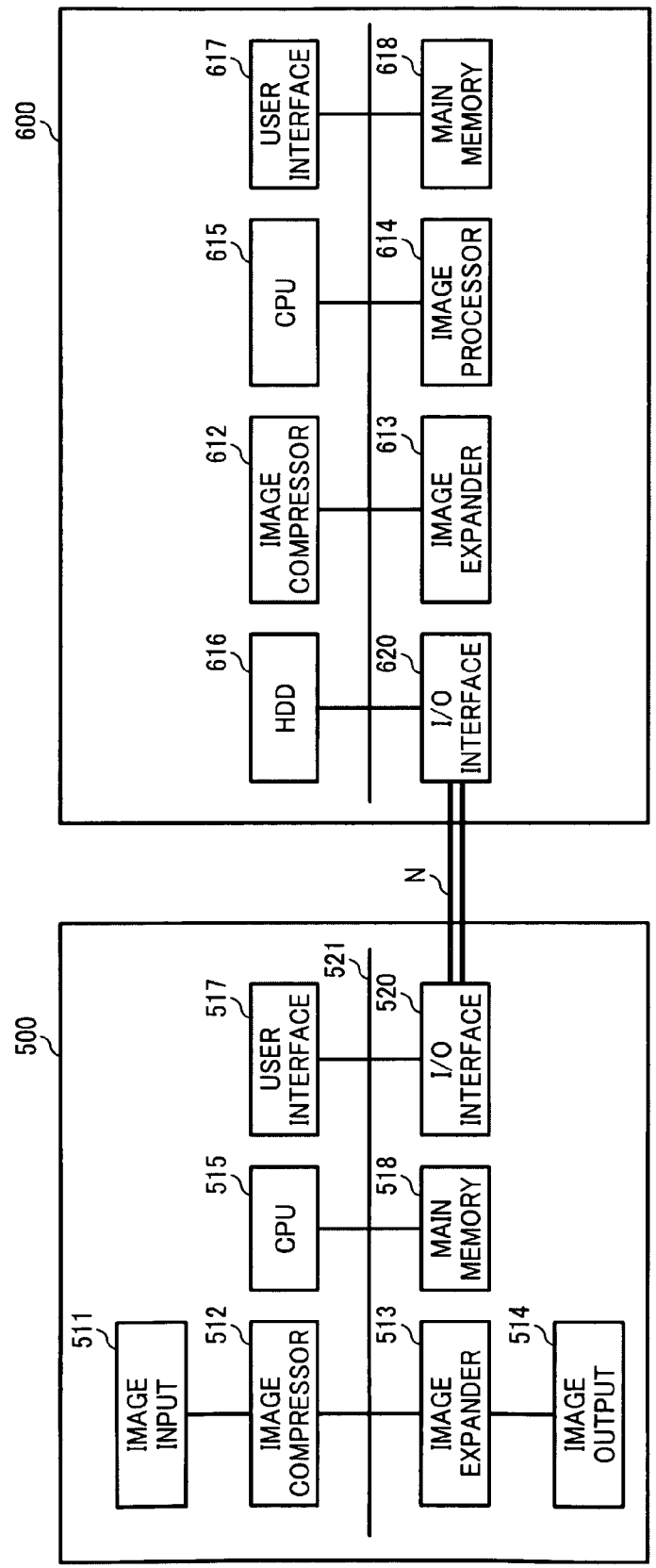
FIG. 23 is a schematic block diagram illustrating an image processing system according to an example embodiment of the present invention.

Referring now to FIG. 23, an example structure of an image processing system is explained according to an example embodiment of the present invention. The image processing system of FIG. 23 includes an image processing apparatus 500 and a server apparatus 600, which are connected via a network N.

The image processing apparatus 500 includes an image input 511, an image compressor 512, an image expander 513, an image output 514, a CPU 515, a main memory 518, a user interface 517, and an I/O interface 520, which are connected through a bus 521. The image processing apparatus 500 of FIG. 23 is substantially similar in structure and function to the image processing apparatus 100 of FIG. 2. The differences include deletion of the image processor 16 and the HDD 19.

Further, in this example, the image compressor 512 and the image expander 513 are each provided. Alternatively, the image compressor 512 and the image expander 513 may be combined into one ASIC. Alternatively, one or more functions provided by the image compressor 512 and the image expander 513 may be performed by the CPU 515.

The server apparatus 600 may be implemented by, for example, a computer capable of communicating via the network N. The server apparatus 600 includes a HDD 616, an image compressor 612, a CPU 615, a user interface 617, an I/O interface 620, an image expander 613, an image processor 614, and a main memory 618, which are connected via a bus. In this example, each of the devices provided above are assumed to be substantially similar in structure and function to the corresponding one of the devices provided in the image processing apparatus 100 of FIG. 2.

Further, in this example, the image compressor 612 and the image expander 613 are each provided. Alternatively, the image compressor 612 and the image expander 613 may be combined into one ASIC. Alternatively, one or more functions provided by the image compressor 612 and the image expander 613 may be performed by the CPU 615.

In one example, the image processing system of FIG. 23 may perform operation of copying an original document after adding the mark to a selected portion of the original document.

The image input 511 reads the original document into image data, and sends the image data to the image compressor 512. The image compressor 512 compresses the image data into compressed image data using the first compression method of FIG. 19A. More specifically, the compressed image data is stored in the main memory 518 together with the pointer data storing address information of each block of the compressed image data. The I/O interface 520 sends the compressed image data and the pointer data to the I/O interface 620 of the server apparatus 600 through the network N.

The server apparatus 600 stores the compressed image data and the pointer data in the HDD 616. In preparation for adding the mark M to a selected portion of the image data, the image expander 613 reads out the selected portion of the compressed image data, and expands the selected portion of the compressed image data to generate expanded blocks. The image processor 614 adds the mark to the expanded blocks to generate processed blocks. The image compressor 612 compresses the processed blocks into the compressed processed blocks. The compressed processed blocks are sent to the image processing apparatus 500 via the network N.

Once the compressed processed blocks are received, the image expander 513 expands the compressed processed blocks. Concurrently, the image expander 513 reads out the other portion of the compressed image data from the main memory 518, and expands the other portion of the compressed image data. The expanded blocks, or the expanded image data, may be subsequently output to the image output 514 in the predetermined order. The image output 514 forms an image according to the expanded image data.

As described above, in this example, the image processing apparatus 500 is not provided with the image processor 614, which applies editing, such as stamping, color space conversion, filtering, format conversion, etc. With this structure, the memory space required for the image processing apparatus 500 or the number of functions required for the image processing apparatus 500 may be suppressed, thus reducing the manufacturing cost of the image processing apparatus 500. Further, since the HDD 616, which requires relatively a large memory space, is not provided, the manufacturing cost of the image processing apparatus 500 may be further reduced. Further, since only the portion of the image data is transmitted from the server apparatus 600 to the image processing apparatus 500 via the network N, the processing speed may increase while suppressing the load on the network N.

Any one of the image processing apparatuses 100, 200, and 500 may perform operation of compressing or expanding image data in various other ways.

In one example, the image processing apparatus may compress the image data using more than one compression method to generate more than one compressed image data, each having a different compression format. For example, the image processing apparatus may apply compression to the image data using the first compression method as described above referring to FIG. 19A to generate the compressed image data using the first compression method, which may be referred to as the first compressed image data. The image processing apparatus may apply JPEG compression to the image data to generate JPEG compressed image data, which may be referred to as the second compressed image data. Depending on a specific instruction from the user, the image processing apparatus may select one of the compressed image data having the compression format applicable to the user instruction. For example, when the user instruction includes a request for applying editing to a selected portion of the image data, the image processing apparatus may select the first compressed image data. In another example, when the user instruction includes a request for sending the compressed image data to the outside through the I/O interface, the image processing apparatus may select the second compressed image data.

In another example, the image processing apparatus may compress the image data using a compression method that has been selected by the user either directly or indirectly. For example, when the user instructs the image processing apparatus to perform operation of transmitting the image data, the image processing apparatus may compress the image data in compliance with JPEG standard. In another example, when the user instructs the image processing apparatus to perform operation of editing, the image processing apparatus may compress the image data in compliance with the first compression method of FIG. 19A. In another example, when the user instruction includes a request for applying compression to the image data having a large size, the image processing apparatus may select the first compression method to reduce the memory resource requirement. In another example, when the user instruction includes a request for applying compression with reduced time, the image processing apparatus may select the first compression method.

In this manner, the image processing apparatus may be able to selectively use the compression method according to the specific need of the user.

In order to be able to apply the first compression method and the second compression method, the image processing apparatus needs to be provided with the JPEG compressor of FIG. 13 and the compressor of FIG. 24. As described above, the JPEG compressor of FIG. 13 and the compressor of FIG. 24 are substantially similar in structure and function, the structure and function common for the JPEG compression method and the first compression method may be integrated into one.

In order to be able to expand the compressed image data compressed using the first compression method and the compressed image data using the second compression method, the image processing apparatus needs to be provided with the JPEG expander of FIG. 16 and the expander of FIG. 25. As described above, the JPEG expander of FIG. 16 and the expander of FIG. 25 are substantially similar in structure and function, the structure and function common for the JPEG expansion method and the first expansion method may be integrated into one.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:
1. An image processing apparatus, comprising:
an input device configured to input image data;
an image compressor device configured to compress the image data into compressed image data; and
a storage device configured to store the compressed image data,
wherein the image compressor device includes:
an image divider configured to divide the image data into a plurality of unit data items;

a compressor configured to compress the plurality of unit data items into a plurality of compressed unit data items;

a memory controller configured to store the plurality of compressed unit data items in the storage device in a manner that the plurality of compressed unit data items are arranged in the continuous address range; and a pointer generator configured to generate pointer data including address information of the plurality of compressed unit data items, the address information of the compressed unit data item specifying a location of the compressed unit data item.

2. The image processing apparatus of claim 1, wherein the plurality of unit data items includes first unit data and second unit data that are adjacent with each other, and wherein the compressor encodes the first unit data and the second unit data independently from each other.

3. The image processing apparatus of claim 1, wherein the compressor of the image compressor device includes:
a plurality of compressors configured to compress the plurality of unit data items in parallel.

4. The image processing apparatus of claim 1, wherein the memory controller is further configured to arrange the plurality of compressed unit data items in an order in which the plurality of unit data items is obtained by the input device.

5. The image processing apparatus of claim 1, further comprising:
a memory space configured to receive the plurality of compressed unit data items from the compressor of the image compressor device and store therein the plurality of compressed unit data items, before the plurality of compressed unit data items are stored in the storage device.

6. The image processing apparatus of claim 5, wherein the memory space includes:
a plurality of areas each configured to store at least one of the plurality of compressed unit items,
wherein the number of plurality of areas of the memory space is equal to or greater than the number of the plurality of compressors of the image compressor device.

7. The image processing apparatus of claim 5, wherein:
the memory controller is further configured to assign each one of the plurality of areas of the memory space with the corresponding one of the plurality of compressed unit data items, and to store one of the plurality of compressed unit data items in the corresponding one of the plurality of areas of the memory space.

8. The image processing apparatus of claim 5, wherein:
the memory controller is further configured to assign each one of the plurality of compressors of the image compressor device with the corresponding one of the plurality of areas of the memory space, and to store at least one of the plurality of compressed unit data items that is compressed by one of the plurality of compressors in the corresponding one of the plurality of areas of the memory space.

9. The image processing apparatus of claim 1, wherein the image divider includes a plurality of buffer memories each configured to store at least one of the plurality of unit data items,
wherein the number of the plurality of buffer memories is equal to or greater than the number of the plurality of compressors of the image compressor device.

10. The image processing apparatus of claim 1, wherein the compressor includes:
a color space conversion device configured to apply color space conversion to at least one of the plurality of unit data items to generate converted unit data;
a spatial conversion device configured to convert the converted unit data to spatial frequency data;
a quantizing device configured to quantize the spatial frequency data into quantized data; and
a coding device configured to apply entropy coding to the quantized data to generate coded data.

11. The image processing apparatus of claim 10, wherein the quantized data includes a quantized DC component, and the coded data includes the value obtained from coding the original value of the quantized DC component.

12. An image processing apparatus, comprising:
a storage device configured to store compressed image data including a plurality of compressed unit data items and pointer data including address information of the plurality of compressed unit data items, the address information of the compressed unit data item specifying a location of the compressed unit data item; and
an image expander device configured to expand the compressed image data into expanded image data;
wherein the image expander device includes:
an expander controller configured to obtain the pointer data from the storage device, and define a portion of the compressed unit data to be expanded; and
an image expander configured to expand one or more of the plurality of compressed unit data items that corresponds to the defined portion of the compressed image data.

13. The image processing apparatus of claim 12, wherein the expander includes:
a decoding device configured to decode at least one of the plurality of compressed unit data items into decoded data;
a dequantizer device configured to dequantize the decoded data into dequantized data;
a spatial conversion device configured to convert the dequantized data into converted data; and
a color space conversion device configured to convert color space of the converted data.

14. The image processing apparatus of claim 13, wherein the decoded data includes a decoded DC component, and the dequantized data includes the value obtained from dequantizing the original value of the decoded DC component.

15. The image processing apparatus of claim 12, wherein the expander of the image expanding device includes:
a plurality of expanders configured to expand the plurality of compressed unit data items in parallel.

16. The image processing apparatus of claim 12, further comprising:
an output device configured to output the expanded image data,
wherein the expander controller of the image expander device is further configured to control an order in which the plurality of expanded unit data items is output by the expander to the output device using the pointer data.

17. The image processing apparatus of claim 12, wherein the expander controller of the image expander device is further configured to control an order in which processing is applied by the image expander using the pointer data.

18. The image processing apparatus of claim 14, further comprising:
an image compressor device configured to compress the expanded image data, wherein the image compressor device includes:
a color space conversion device configured to apply color space conversion to at least one of the plurality of unit data items of the expanded image data to generate converted unit data;
a spatial conversion device configured to convert the converted unit data to spatial frequency data;
a quantizing device configured to quantize the spatial frequency data into quantized data, the quantized data including a quantized DC component; and
a coding device configured to apply entropy coding to the quantized data to generate coded data, the coded data including the value obtained from coding the difference value of the quantized DC components that are adjacent with each other.

* * * * *